(12) United States Patent
Choi et al.

(10) Patent No.: US 12,486,492 B2
(45) Date of Patent: Dec. 2, 2025

(54) METHOD FOR PRODUCING MEMORY-LIKE NK CELLS WITH ABILITY TO EXPRESS HIGHER LEVELS OF NCRS, CYTOTOXICITY, AND IFN-γ THAN NK CELLS IN HUMAN PERIPHERAL BLOOD

(71) Applicant: KOREA RESEARCH INSTITUTE OF BIOSCIENCE, Daejeon (KR)

(72) Inventors: In Pyo Choi, Daejeon (KR); Suk Ran Yoon, Daejeon (KR); Soo Yeon Park, Daejeon (KR); Han Na Kim, Daejeon (KR); Sol Ji Jung, Daejeon (KR)

(73) Assignee: Korea Research Institute of Bioscience, Daejeon (KR)

( * ) Notice: Subject to any disclaimer, the term of this patent is extended or adjusted under 35 U.S.C. 154(b) by 564 days.

(21) Appl. No.: 16/809,935

(22) Filed: Mar. 5, 2020

(65) Prior Publication Data

US 2021/0277358 A1    Sep. 9, 2021

(51) Int. Cl.
*C12N 5/0783* (2010.01)
*A61K 40/15* (2025.01)
*A61K 40/42* (2025.01)

(52) U.S. Cl.
CPC ............ *C12N 5/0646* (2013.01); *A61K 40/15* (2025.01); *A61K 40/42* (2025.01); *C12N 2501/2312* (2013.01); *C12N 2501/2315* (2013.01); *C12N 2501/2318* (2013.01); *C12N 2501/2321* (2013.01); *C12N 2506/11* (2013.01)

(58) Field of Classification Search
CPC .............................. C12N 5/0646; A61K 35/17
See application file for complete search history.

(56) References Cited

U.S. PATENT DOCUMENTS

| | | | |
|---|---|---|---|
| 8,926,964 B2 | 1/2015 | Hariri et al. | |
| 9,404,083 B2 | 8/2016 | Yonemitsu et al. | |
| 9,464,274 B2 | 10/2016 | Hariri et al. | |
| 9,834,753 B2 | 12/2017 | Mia et al. | |
| 2012/0121544 A1* | 5/2012 | Choi | A61K 39/4644 |
| | | | 435/375 |
| 2013/0011376 A1 | 1/2013 | Peled et al. | |
| 2014/0023626 A1 | 1/2014 | Peled et al. | |
| 2014/0120072 A1 | 5/2014 | Yonemitsu et al. | |
| 2015/0152387 A1 | 6/2015 | Lee et al. | |
| 2018/0125888 A1* | 5/2018 | Copik | A61K 35/33 |
| 2019/0314445 A1* | 10/2019 | Romagnani | A61K 40/42 |

FOREIGN PATENT DOCUMENTS

| | | |
|---|---|---|
| CN | 103923879 A | 7/2014 |
| EP | 1185867 B1 | 3/2005 |
| JP | 2013-532469 A | 8/2013 |
| JP | 2015-502756 A | 1/2015 |
| KR | 10-2010-0045704 A | 5/2010 |
| KR | 10-1077912 B1 | 10/2011 |
| KR | 10-2012-0100207 A | 9/2012 |
| KR | 10-2014-0051263 A | 4/2014 |
| WO | 00/73794 A2 | 12/2000 |
| WO | 2010-013947 A2 | 2/2010 |
| WO | 2012/009422 A | 1/2012 |
| WO | 2013/094988 A1 | 6/2013 |
| WO | 2013-168978 A | 11/2013 |
| WO | WO-2016122014 A1 * | 8/2016 ............. A61K 35/17 |

OTHER PUBLICATIONS

Fehniger et al. "Harnessing NK Cell Memory for Cancer Immunotherapy", Trends Immunol. Dec. 2016;37(12):877-888 (Year: 2016).*
Walk et al. "Activatory Receptor NKp30 Predicts NK Cell Activation During Controlled Human Malaria Infection", Front Immunol. 2019; 10: 2864. (Year: 2019).*
Romee et al. "Cytokine activation induces human memory-like NK cells", Blood. Dec. 6, 2012;120(24):4751-60. (Year: 2012).*
Leong et al. "Preactivation with IL-12, IL-15, and IL-18 Induces CD25 and a Functional High-Affinity IL-2 Receptor on Human Cytokine-Induced Memory-like Natural Killer Cells", Biol Blood Marrow Transplant. Apr. 2014;20(4):463-73. (Year: 2014).*
Choi et al (Biol. Blood Marrow Transplant. May 1, 2014, 20: 696-704) (Year: 2014).
CliniMACSTM 2019 (Year: 2019).
RosetteSepTM 2019 (Year: 2019).
CyroStorR CS10 (2019) (Year: 2019).
Tonn, T, et al.; "Treatment of patients with advanced cancer with the natural killer cell line NK-92"; Cytotherapy; vol. 15, No. 12; 2013, pp. 1563-1570 (8 pages).
Extended European Search Report issued in corresponding European Application No. 16743625.2 dated Jan. 26, 2018 (9 pages).
Office Action issued in corresponding Japanese Application No. 2017-536867 dated May 31, 2018, and English translation thereof (10 pages).
"The proinflammatory cytokines IL-2, IL-15 and IL-21 modulate the repertoire of mature human natural killer cell receptors", Arthritis Research & Therapy, 2007, Vo. 9, R125, pp. 1-15. National Publication of International Patent Application No. 2013-532469 (15 pages).
Improved Post-Thaw Recovery of Peripheral Blood Stem/Progenitor Cells Using a Novel Intracellular-like Cryopreservation Solution Cytotherapy: 2009, vol. 11, No. 4, pp. 472-479 (14 pages).
International Search Report issued in PCT/KR2016/000474 mailed on Apr. 27, 2016 (2 pages).
Written Opinion of the International Searching Authority issued in PCT/KR2016/000474 mailed on Apr. 27, 2016 (10 pages).

(Continued)

*Primary Examiner* — Daniel E Kolker
*Assistant Examiner* — Peter Johansen
(74) *Attorney, Agent, or Firm* — Norris McLaughlin, P.A.

(57) ABSTRACT

The present disclosure relates to a method for producing of a memory-like natural killer cell having an ability to produce a higher level of a natural killer cell receptor, having a better killing capacity, and having an ability to produce a higher level of IFN-γ than a natural killer cell in human peripheral blood, and a memory-like natural killer cell produced by the method, and a cancer treatment method using the memory-like natural killer cell.

7 Claims, 15 Drawing Sheets

(56) References Cited

OTHER PUBLICATIONS

International Search Report issued in PCT/KR2015/000854 mailed on Oct. 26, 2015 (3 pages).
Choi, I. et al.; "Donor-Derived Natural Killer Cells Infused after Human Leukocyte Antigen-Haploidentical Hematopoietic Cell Transplantation: A Dose-Escalation Study"; Biology of Blood and Marrow Transplantation, vol. 20, No. 5, 2014, pp. 696-704 (9 pages).
De Maria, A. et al.; "Revisiting human natural killer cell subset function revealed cytolytic CD56dimCD16+ NK cells as rapid producers of abundant IFN-g on activiation"; PNAS, vol. 108, No. 2, Jan. 11, 2011, pp. 728-732 (5 pages).
Di Santo, J.P. et al.; "Natural Killer Cell Developmental Pathways: A Question of Balance"; Annu. Rev. Immunol., vol. 24, 2006, pp. 257-286 (32 pages).
Cooper, M.A. et al.; "The biology of human natural killer-cell subsets"; TRENDS in Immunology, vol. 22, No. 11, Nov. 2001, pp. 633-640 (8 pages).
Itoh, K. et al.; "Lysis of Human Solid Tumor Cells by Lymphokine-Activated Natural Killer Cells"; The Journal of Immunology, vol. 136, No. 10, May 15, 1986, pp. 3910-3915 (6 pages).
Bordignon, C. et al.; "Cell therapy: achievements and perspectives"; Haematologica, vol. 84, 1999, pp. 1110-1149 (40 pages).
Konjević, G. et al.; "Association of NK cell dysfunction with changes in LDH characteristics of peripheral blood lymphocytes (PBL) in breast cancer patients"; Breast Cancer Research and Treatment, vol. 66, 2001, pp. 255-263 (9 pages).
Ryuke, Y. et al.; "Growth inhibition of subcutaneous mouse melanoma and induction of natural killer cells by liposome-mediated interferon-b gene therapy"; Melanoma Research, vol. 13, 2003, pp. 349-356 (8 pages).
Villegas, F.R. et al.; "Prognostic significance of tumor infiltrating natural killer cells subset CD57 in patients with squamous cell lung cancer"; Lung Cancer, vol. 35, 2002, pp. 23-28 (6 pages).
Castriconi, R. et al.; "Human NK cell infusions prolong survival of metastatic human neuroblastoma-bearing NOD/scid mice"; Cancer Immunol Immunother, vol. 56, 2007, pp. 1733-1742 (10 pages).
Dewan, Z., Md. et al.; "Role of natural killer cells in hormone-independent rapid tumor formation and spontaneous metastasis of breast cancer cells in vivo"; Breast Cancer Res. Treat., vol. 104, 2007, pp. 267-275 (9 pages).
Galy, A. et al.; "Human T, B, Natural Killer, and Dendritic Cells Arise from a Common Bone Marrow Progenitor Cell Subset"; Immunity, vol. 3, Oct. 1995, pp. 459-473 (15 pages).
Mrózek, E. et al.; "Role of Interleukin-15 in the Development of Human CD56+ Natural Killer Cells from CD34+ Hematopoietic Progenitor Cells"; Blood, vol. 87, No. 7, Apr. 1, 1996, pp. 2632-2640 (10 pages).

Sivori, S. et al.; "IL-21 induces both rapid maturation of human CD34+ cell precursors towards NK cells and acquisition of surface killer Ig-like receptors"; Eur. J. Immunol. vol. 33, 2003, pp. 3439-3447 (9 pages).
Grzywacz, B. et al.; "Coordinated acquisition of inhibitory and activating receptors and functional properties by developing human natural killer cells"; Blood, vol. 108, No. 12, Dec. 1, 2006, pp. 3824-3833 (10 pages).
DiSanto, J.P. et al.; "Lymphoid development in mice with a targeted deletion of the interleukin 2 receptor g chain"; Proc. Natl. Acad. Sci. USA, vol. 92, Jan. 1995, pp. 377-381 (5 pages).
Shibuya, A. et al.; "Lymphokine Requirement for the Generation of Natural Killer Cells from CD34+ Hematopoietic Progenitor Cells"; Blood, vol. 85, No. 12, Jun. 15, 1995, pp. 3538-3546 (9 pages).
DiSanto, et al.; J P et "Absence of Interleukin 2 Production in a Severe Combined Immunodeficiency Disease Syndrome with T Cells"; J. Exp. Med., vol. 171, May 1990, pp. 1697-1704 (8 pages).
Ogasawara, K. et al.; "Requirement for IRF-1 in the microenvironment supporting development of natural killer cells"; Nature, vol. 391, Feb. 12, 1998, pp. 700-703 (4 pages).
Leonard, W.J. et al.; "Interleukin-21: A Modulator of Lymphoid Proliferation, Apoptosis and Differentiation"; Nature, vol. 5, Sep. 2005, pp. 688-697 (11 pages).
Takaki, R. et al.; "IL-21 Enhances Tumor Rejection through a NKG2D-Dependent Mechanism"; The Journal of Immunology, vol. 175, 2005, pp. 2167-2173 (7 pages).
Asao, H. et al.; "Cutting Edge: The Common g-Chain Is an Indispensable Subunit of the IL-21 Receptor Complex"; The Journal of Immunology, vol. 167, 2001, pp. 1-5 (5 pages).
Parrish-Novak, J. et al.; "Interleukin 21 and its receptor are involved in NK cell expansion and regulation of lymphocyte function"; Nature, vol. 408, Nov. 2, 2000, pp. 57-63 (7 pages).
Strengell, M. et al.; "IL-21 in Synergy with IL-15 or IL-18 Enhances IFN-g Production in Human NK and T Cells"; The Journal of Immunology, vol. 170, 2003, pp. 5464-5469 (6 pages).
Brady, J. et al.; "IL-21 Induces the Functional Maturation of the Murine NK Cells"; The Journal of Immunology, vol. 172, 2004, pp. 2048-2058 (11 pages).
Moroz, A. et al.; "IL-21 Enhances and Sustains CD8+ T Cell Responses to Achieve Durable Tumor Immunity: Comparative Evaluation of IL-2, IL-15, and IL-21"; The Journal of Immunology, vol. 173, 2004, pp. 900-909 (10 pages).
Written Opinion of the International Searching Authority issued in PCT/KR2015/000854 mailed on Oct. 26, 2015 (10 pages).
Koehl, U. et al.; "IL-2 activated NK cell immunotherapy of three children after haploidentical stem cell transplantation"; Blood Cells, Molecules & Diseases, vol. 33, 2004, pp. 261+-266 (6 pages).

* cited by examiner

| Cytotoxicity (%) | | K562 | Raji | A498 | ACHN |
|---|---|---|---|---|---|
| PB-NK-memory | (−) | 31.7 | 26.7 | 10.9 | 16.3 |
| | (+) | 43.0 | 40.4 | 20.6 | 33.9 |
| KRIBB-NK-memory | no | 48.6 | 63.8 | 42.0 | 48.5 |
| | 12+15 | 52.2 | 68.5 | 45.7 | 49.8 |
| | 15+18 | 52.5 | 64.2 | 46.2 | 48.5 |

FIG. 5
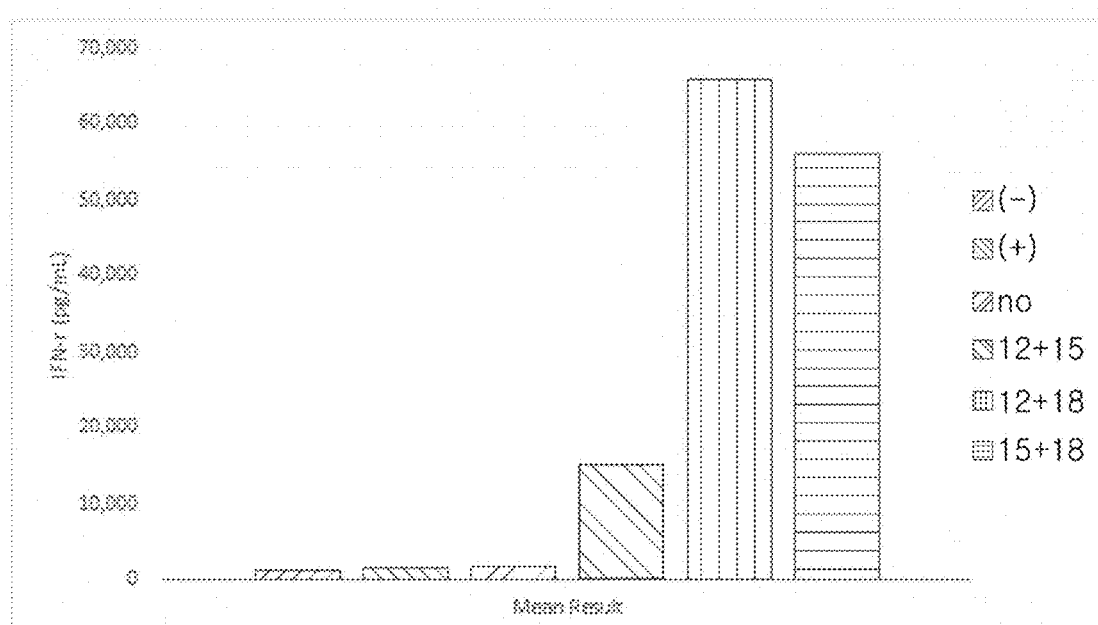
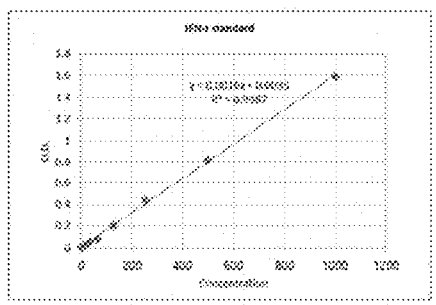

METHOD FOR PRODUCING MEMORY-LIKE NK CELLS WITH ABILITY TO EXPRESS HIGHER LEVELS OF NCRS, CYTOTOXICITY, AND IFN-γ THAN NK CELLS IN HUMAN PERIPHERAL BLOOD

TECHNICAL FIELD

The present disclosure relates to a production method of a memory-like natural killer cell having an ability to produce a higher level of a natural killer cell receptor, having a better killing capacity, and having an ability to produce a higher level of IFN-γ than a natural killer cell in human peripheral blood, and a memory-like natural killer cell produced by the method, and a cancer treatment method using the memory-like natural killer cell.

BACKGROUND

A natural killer cell (NK cell) is a subtype of lymphocyte in bone marrow, lymph node, and peripheral blood. The NK cells account for about 10 to 15% of all lymphocytes, and are the third most common subtype thereof while T and B cells are first and second common subtypes thereof. The NK cells as an immune cell capable of killing cancer cells or cells infected with viruses play an important role in the innate immune response. Functions of the natural killer cells are regulated by interaction between receptors on a cell surface and corresponding target cell ligands without stimulation of a specific antigen. The receptors are classified into activating and inhibitory receptors. Natural cytotoxicity receptors (NCRs: NKp30, NKp44, NKp46) and NKG2D are well known as activating receptors that transmit activation signals to natural killer cells to regulate function thereof. The natural killer cells detect target cells using various activating receptors with different ligand specificities, and these receptors induce activation mainly via phosphorylation and have different signal transmission characteristics. NCRs (NKp30, NKp44, NKp46) and CD16 are known to form complexes with FcRγ, CD3γ, and DAP12 having ITAM motifs and to transmit activation signals in a similar manner to that in TCR and BCR in T and B cells. NKG2D binds to the DAP10 adapter having a YINM motif and transmits signals via PI3K or Grb2-Vav1 complexes. In particular, it is found that natural killer cells to achieve high expression of NCRs have higher cytotoxicity than NK cells to achieve low expression thereof. Thus, the degree of activation of the natural killer cells is identified based on the expression level of NCRs.

Activated natural killer cells may synthesize various granules and secrete them out of the cells to destroy target cells. Perforin and granzyme as representative proteins contained in granules play a major role in destroying the target cells. Perforin gathers on the cell membrane of the target cell to form a complex, punctures the cell membrane, thus causing cell lysis. Granzyme enters cells through pores created in the cell to activate caspase as well as induce apoptosis via various mechanisms.

Further, natural killer cells bind to death receptors of the cancer cells using death ligands such as FasL and TRAIL to induce the cancer cell death. The binding of these receptors activates caspase-8 and -10 in the cancer cells, and thus activates caspase-3 and -7, thus resulting in cell suicide.

In addition, natural killer cells secrete various cytokines and chemokines and play an important role in activating acquired immune responses via direct interaction with antigen-presenting cells. IFN-γ secreted from activated natural killer cells activates and matures monocytes and dendritic cells and thus plays an important role in increasing the innate immune response to pathogens. IFN-γ plays an important role in the early Th1 immune response.

In order for the natural killer cell to have the above capability, priming is required before the NK cell encounters a target cell. Thus, precursor natural killer cells isolated from rats and humans have significantly reduced cancer cell killing capacity and IFN-γ production capacity. IL-2 and IL-15 have been reported as priming cytokines that may maximize the above capacity of the natural killer cells.

For example, it has been reported that IL-2 has a function of enhancing the proliferation and activation of mature natural killer cells. IL-15 is known to be involved in natural killer cell differentiation. In addition, IL-21 is a cytokine secreted by activated CD4+ T cells. Further, a receptor (IL-21R) of IL-21 is known to be expressed in lymphocytes such as dendritic cells, natural killer cells, T cells, and B cells.

As described above, the natural killer cells are known to play an important role in the innate immune response. In this connection, in recent years, it has been confirmed that when, initial stimulation, then cultivation for rest and then re-stimulation of the NK cells are performed, natural killer cells having memory-like cell function as in T cells are produced. Thus, related research is being actively conducted.

In addition, clinical trials have been reported to treat acute myeloid leukemia patients using memory-like natural killer cells induced using cytokine.

Although the memory-like natural killer cells are produced using the cytokines and have potential use as cancer therapeutics, the relevant research and development are still slow. In particular, there are needs to produce high activity natural killer cells instead of low activity natural killer cells present in the body, and to produce the memory-like natural killer cell based on the high activity natural killer cells and to use the memory-like natural killer for anticancer purpose.

SUMMARY

The present inventors treated CD3-negative cells with a mixture of cytokines of IL-15 and IL-21 to stimulate NK cells, and cultured the stimulated NK cells and then treated the cultured natural killer cells with a combination of cytokines including IL-12, IL-15 and/or IL-18 to produce memory-like natural killer cells. Then, the functional efficiency of the produced memory-like natural killer cells was confirmed. In this way, the present disclosure was completed.

Accordingly, an exemplary embodiment of the present disclosure provides cytokine-induced memory-like NK cells derived using at least one cytokine selected from a group consisting of IL-12, IL-15, and IL-18, and having one or more features selected from a group consisting of:
  a) increase in expression of NKp30 and/or CD25 greater than increase in expression thereof in a natural killer cell isolated from peripheral blood or a known conventional memory-like natural killer cell;
  b) decrease in expression of NKp44 and/or KIR2DL2/3 greater than decrease in expression thereof in a natural killer cell isolated from peripheral blood or a known conventional memory-like natural killer cell; and
  c) increase in secretion of IFN-γ greater than increase in secretion thereof in a natural killer cell isolated from peripheral blood or a known conventional memory-like natural killer cell.

Another exemplary embodiment of the present disclosure provides a method for producing a cytokine-induced memory-like natural killer cell, the method including:

1) removing only CD3-positive T cells from monocytes to obtain CD3-negative cells;
2) treating the CD3-negative cells of the step 1) with a mixture of IL-15 and IL-21 and culturing the treated CD3-negative cells; and
3) treating the cultured CD3-negative cells of the step 2) with at least one cytokine selected from a group consisting of IL-12, IL-15, and IL-18, in which the step 1) includes crosslinking the CD3-positive T cells with erythrocytes and then separating the CD3-negative cells using a density gradient during centrifugation, in which other cytokines other than IL-15 and IL-21 do not involve in the step 2).

Yet another exemplary embodiment of the present disclosure provides a method for treating cancer of a subject, the method including administering the cytokine-induced memory-like natural killer cells to the subject in need thereof.

Yet another exemplary embodiment of the present disclosure provides a pharmaceutical composition for preventing or treating cancer, the composition containing the cytokine-induced memory-like natural killer cells.

Yet another exemplary embodiment of the present disclosure provides a composition for use in cancer treatment, the composition containing the cytokine-induced memory-like killer cells.

Yet another exemplary embodiment of the present disclosure provides use of the cytokine-induced memory-like killer cells in production of a drug for treatment of cancer.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIGS. 2A-2K show FACS to identify changes in natural killer cell receptor expression for cytokine-induced memory-like natural killer cells (KRIBB-NK-memory NK) according to the present disclosure and for memory-like natural killer cells (PB-NK-memory NK) produced from peripheral blood-derived natural killer cells.

FIG. 5 shows results of identifying change in secretion of IFN-γ in cytokine-induced memory-like natural killer cells (KRIBB-NK-memory NK) according to the present disclosure and in memory-like natural killer cells (PB-NK-memory NK) produced from peripheral blood-derived natural killer cells.

DETAILED DESCRIPTION

Figure 1:
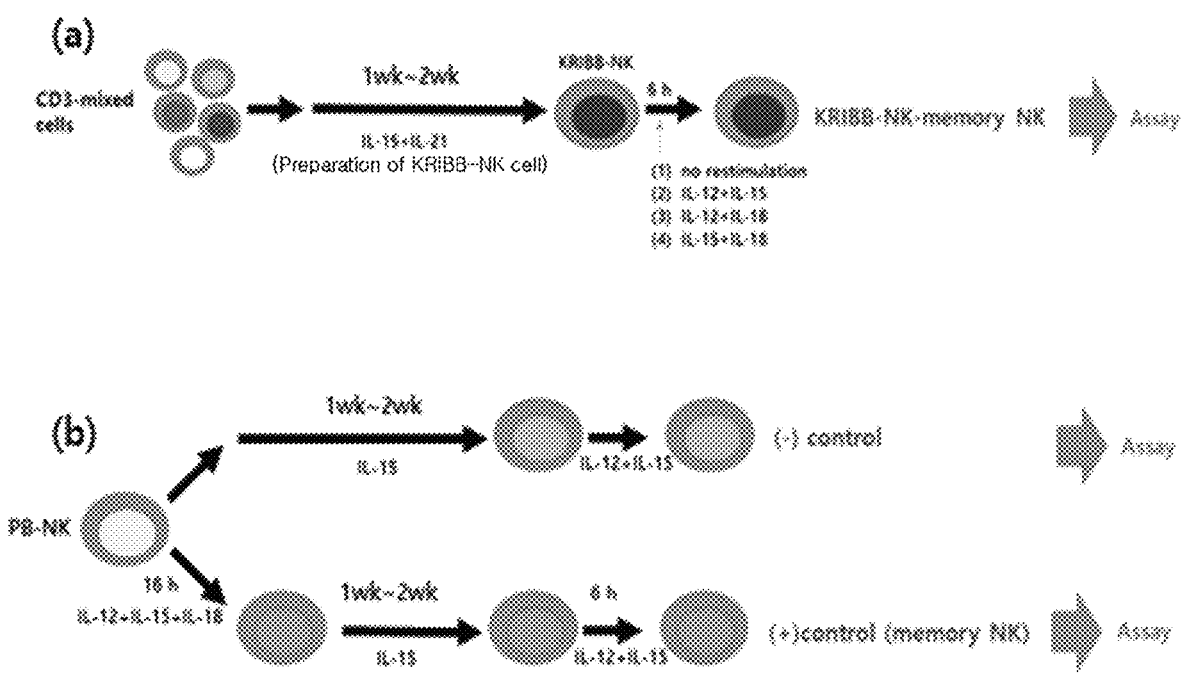
FIG. 1 shows a production process of cytokine-induced memory-like natural killer cells according to the present disclosure and a production process of memory-like natural killer cells produced from peripheral blood-derived natural killer cells.
Figure 2A:
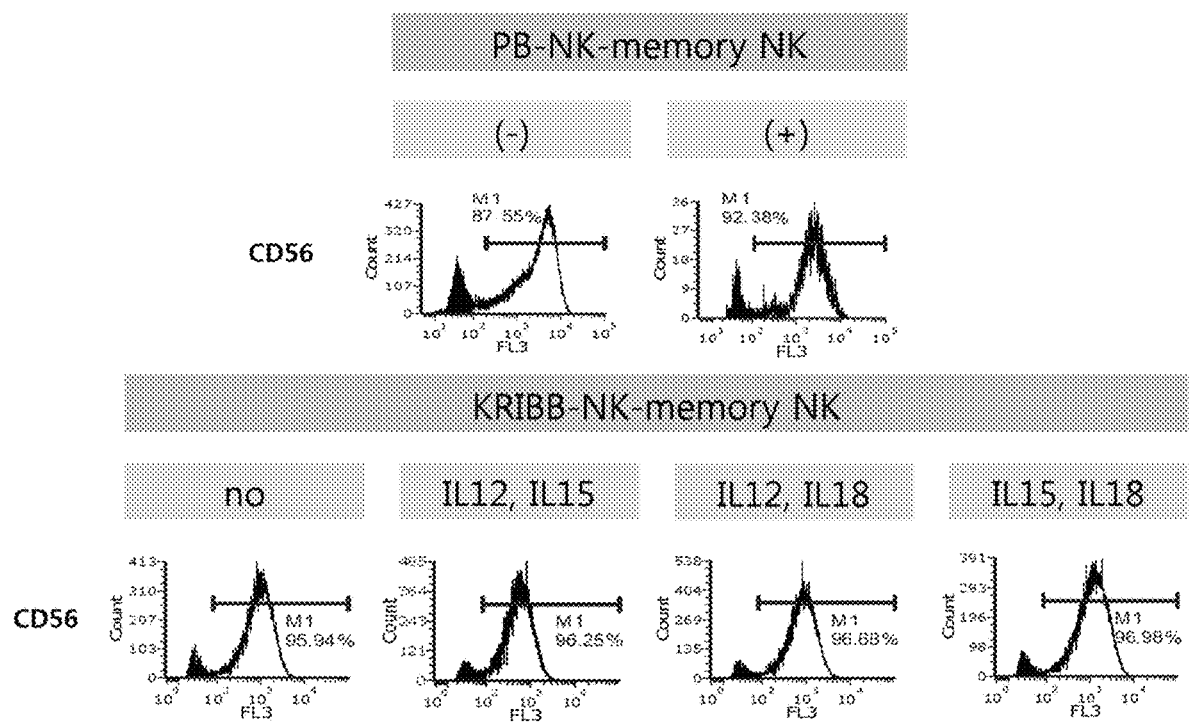
Figure 2B:
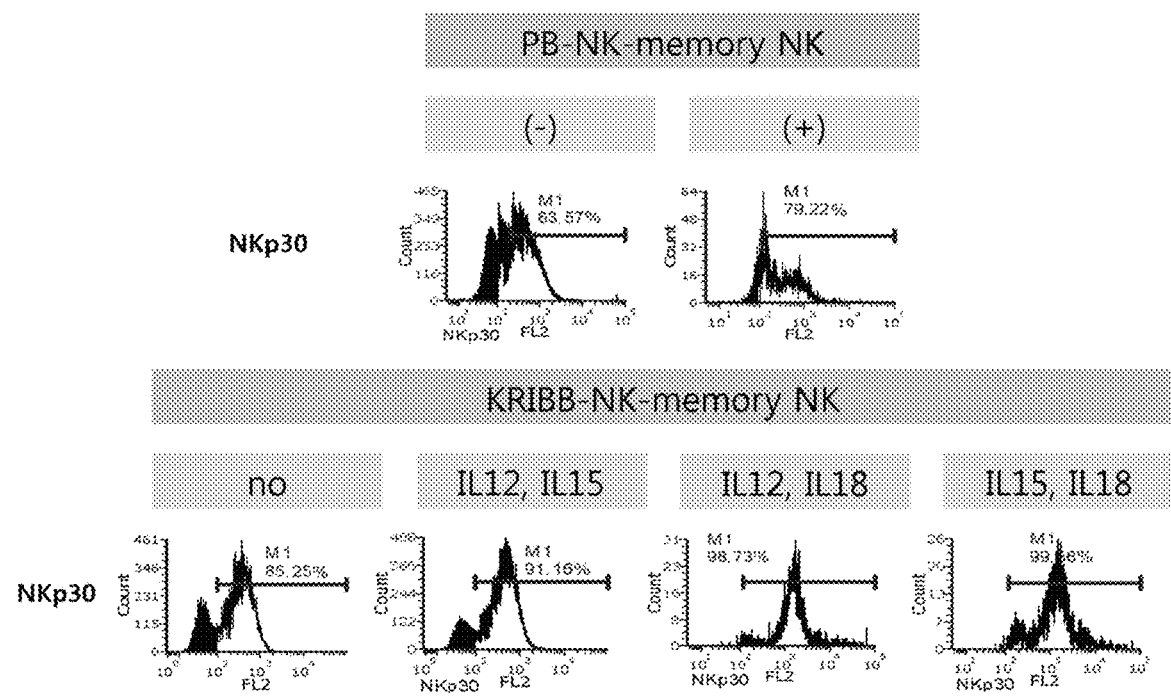
Figure 2C:
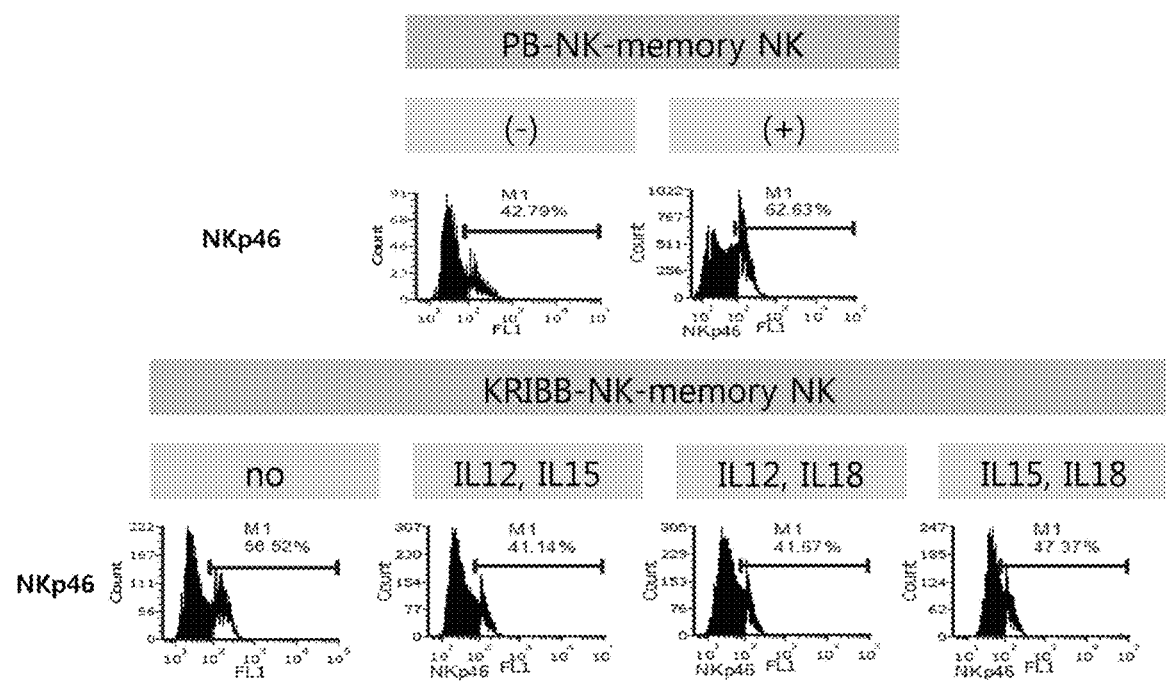
Figure 2D:
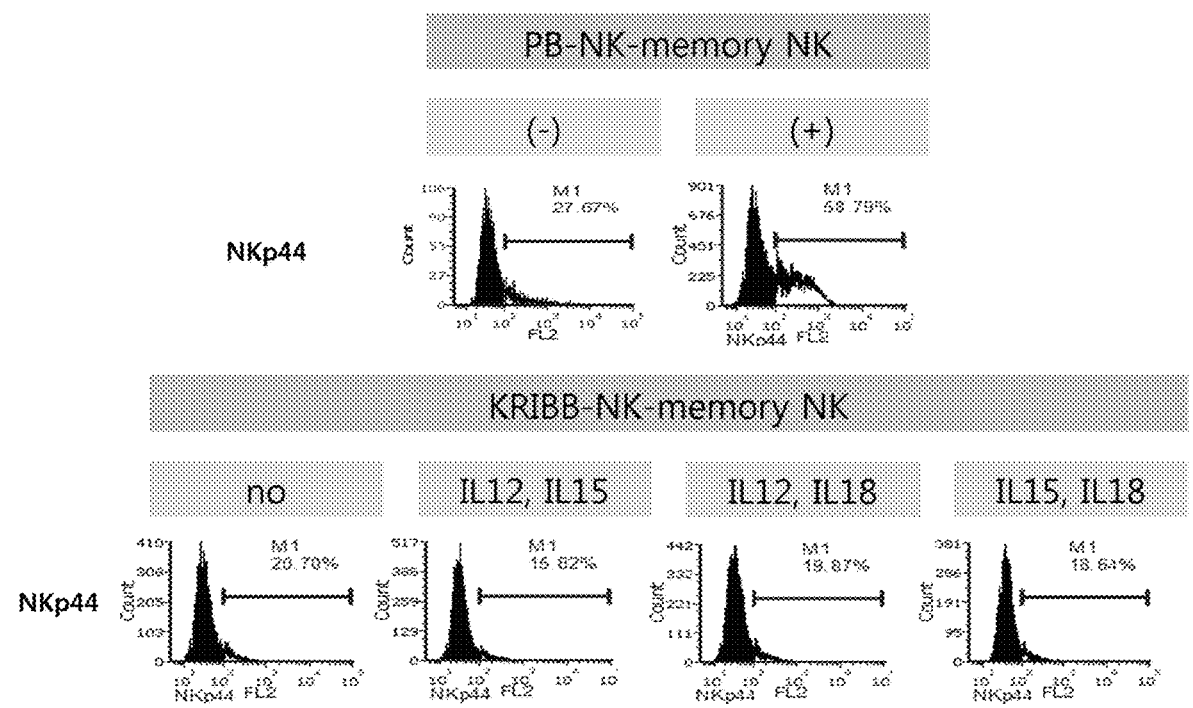
Figure 2E:
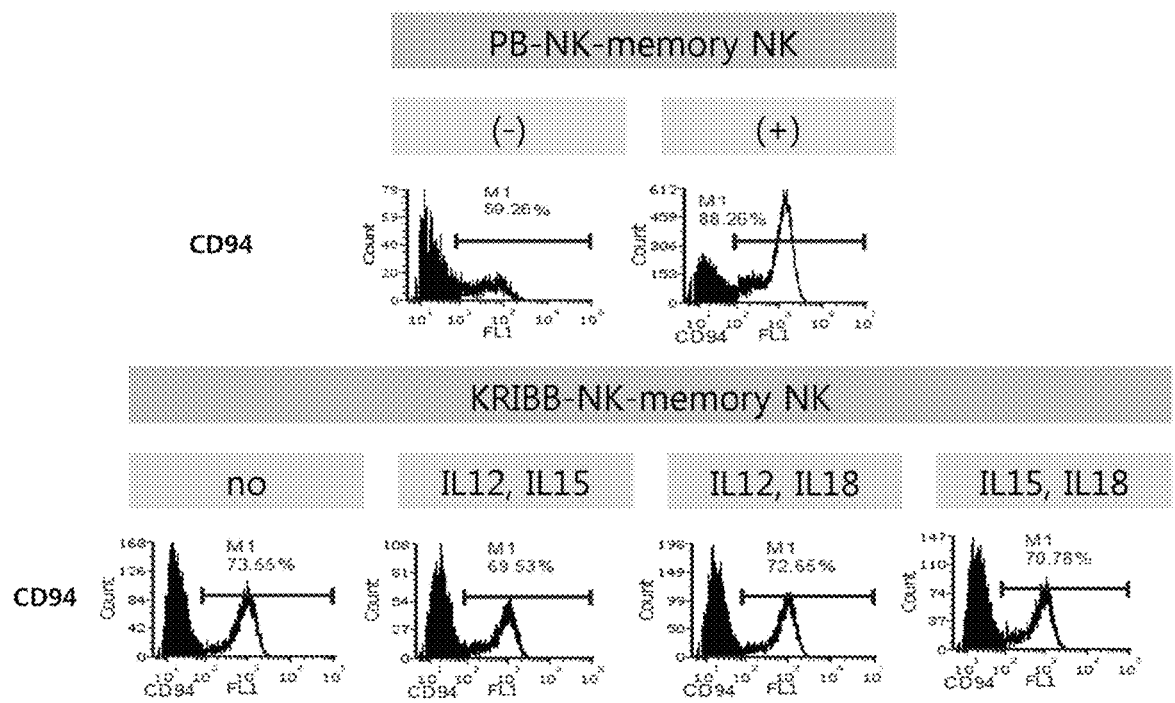
Figure 2F:
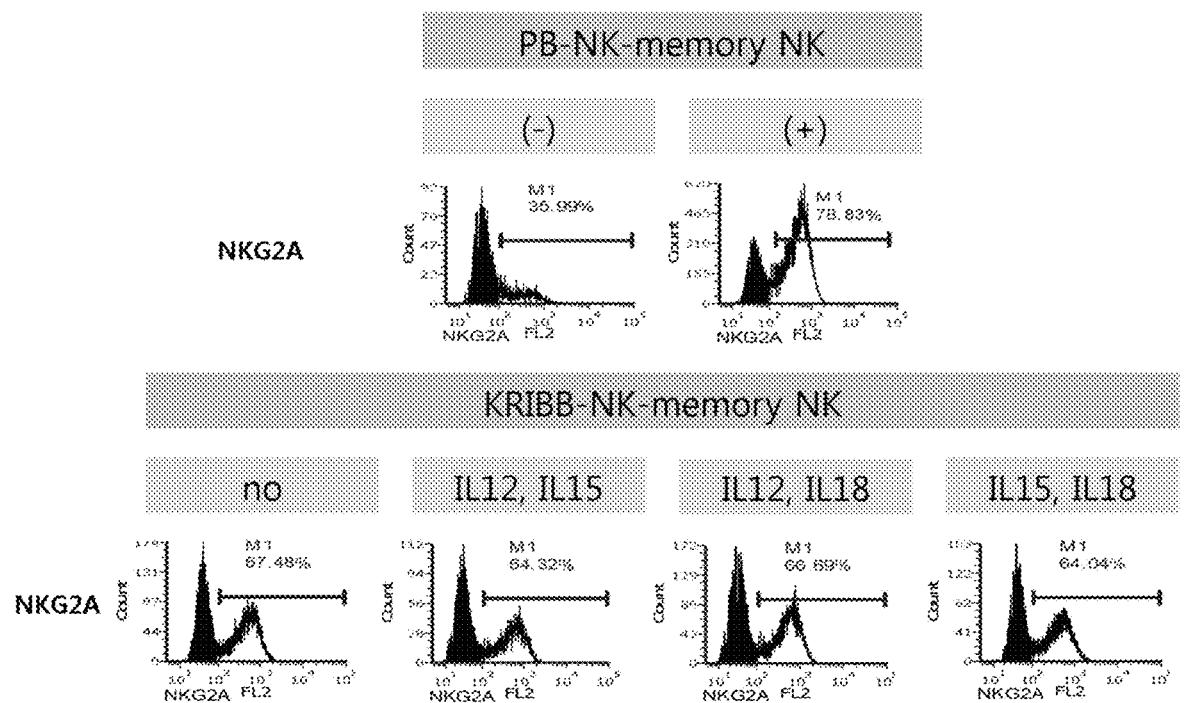
Figure 2G:
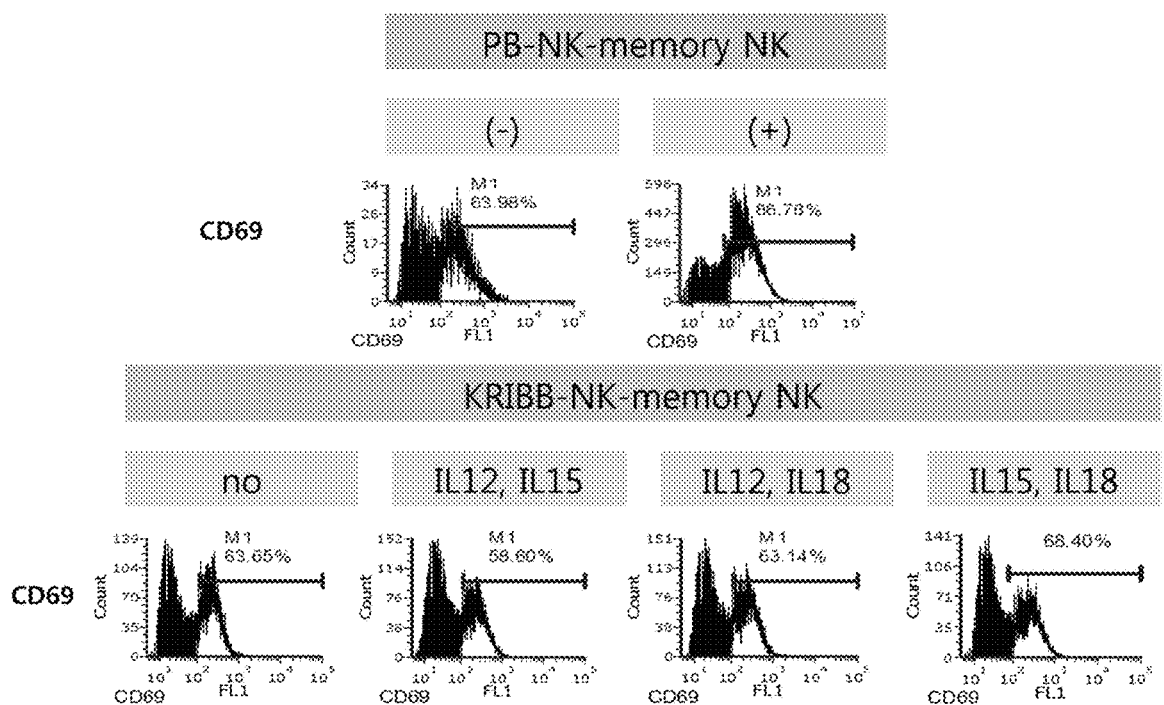
Figure 2H:
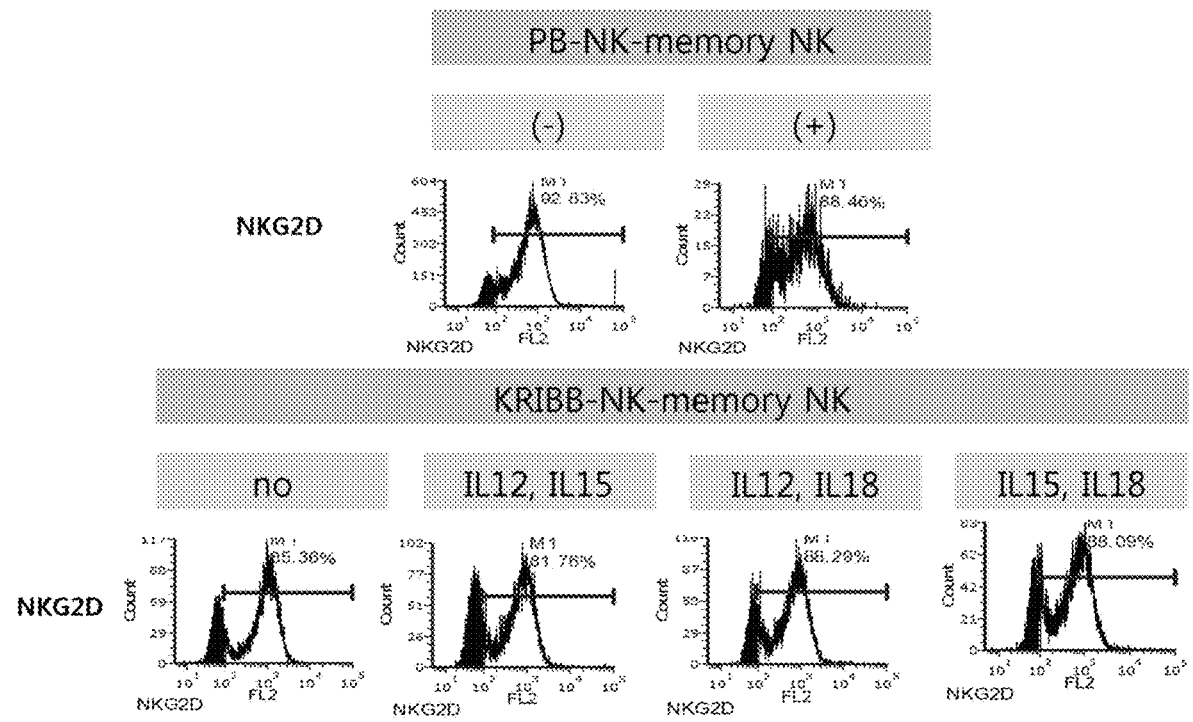
Figure 21:
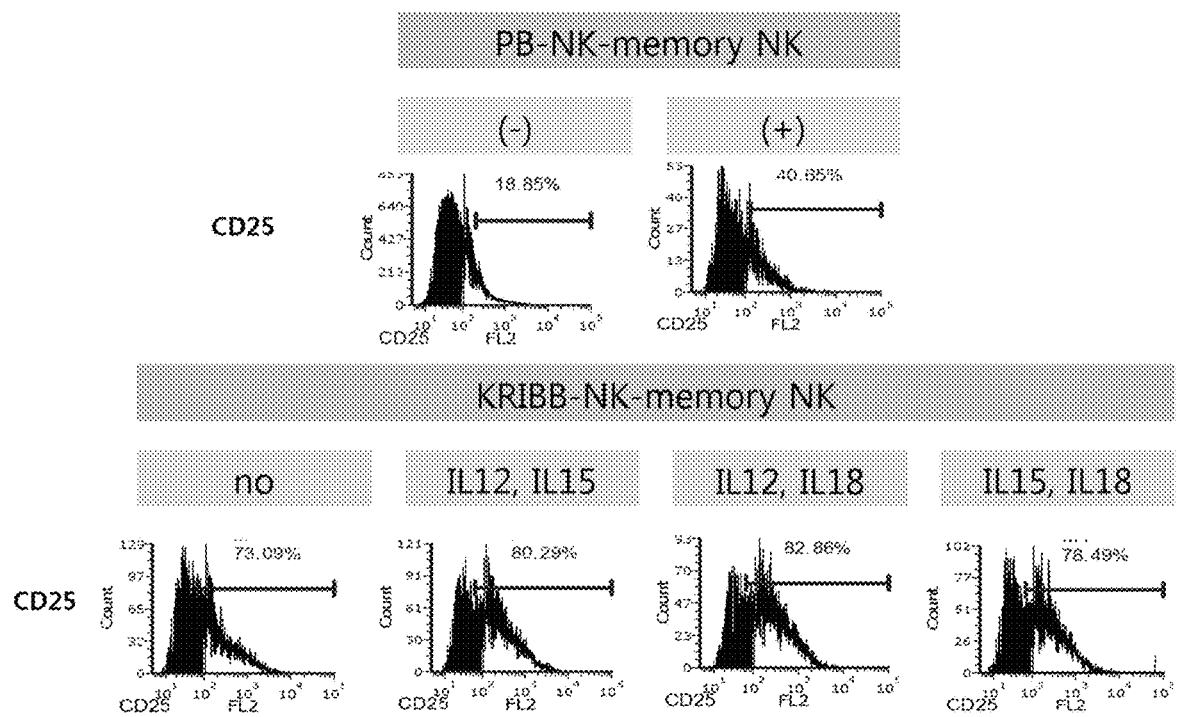
Figure 2J:
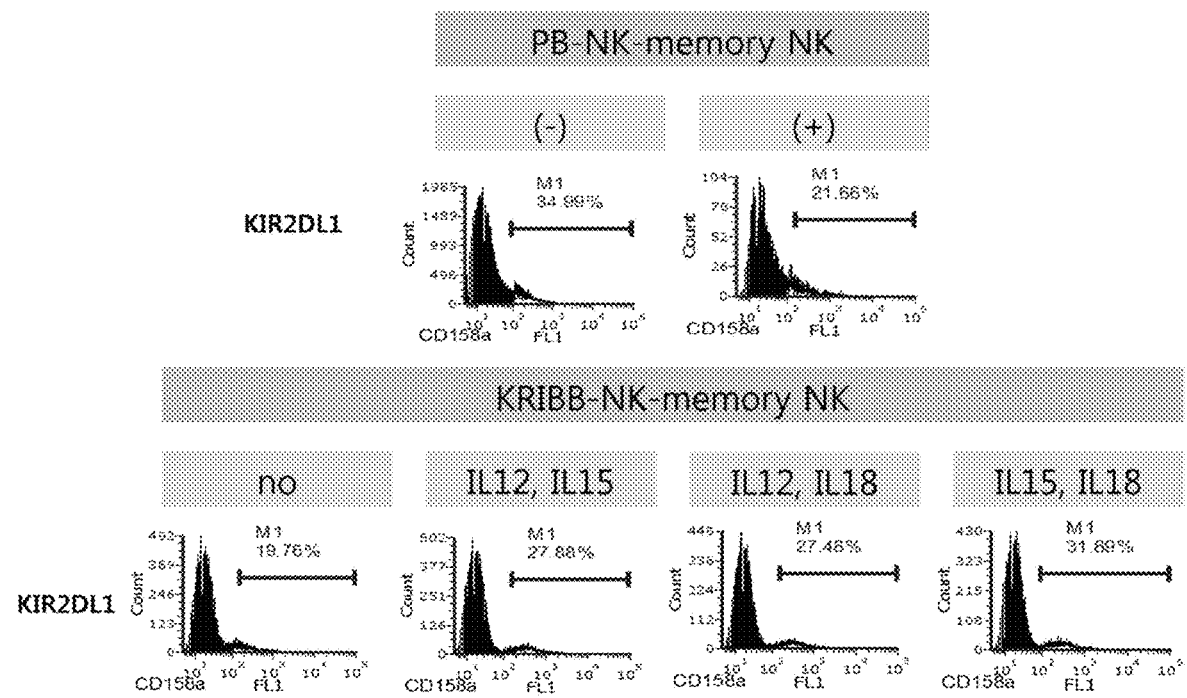
Figure 2K:
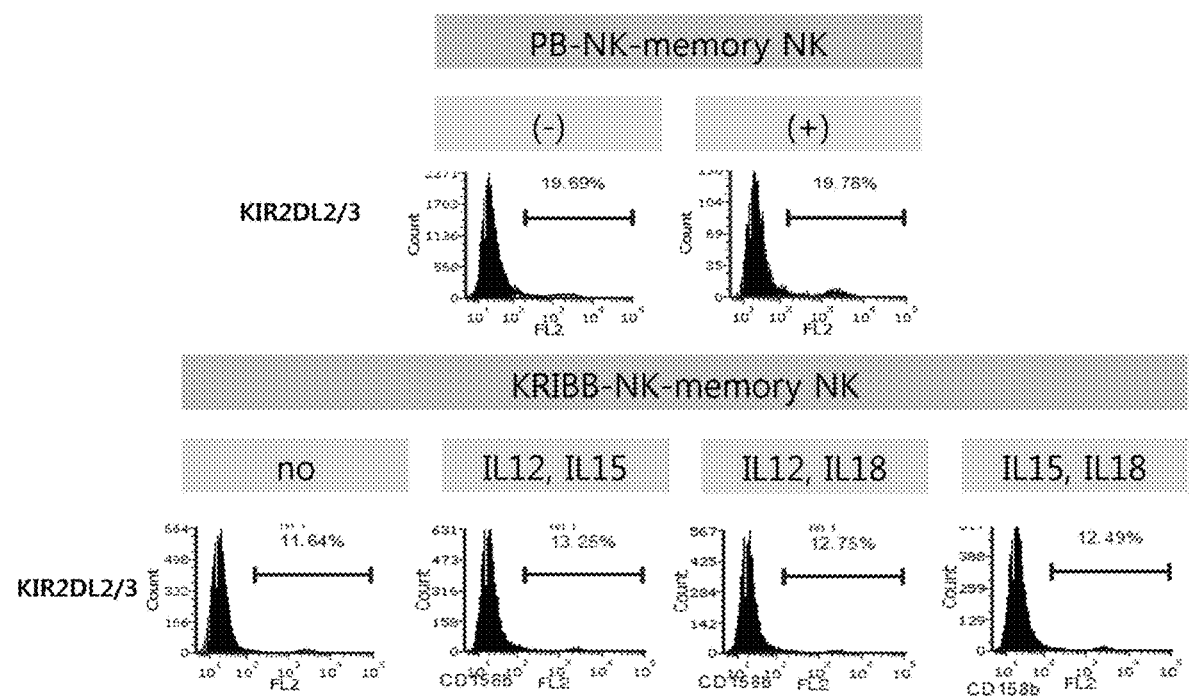

In the following detailed description, reference is made to the accompanying drawing, which forms a part hereof. The illustrative embodiments described in the detailed description, drawing, and claims are not meant to be limiting. Other embodiments may be utilized, and other changes may be made, without departing from the spirit or scope of the subject matter presented herein.

Hereinafter, the terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", "including", "haves" and "having" when used in this specification, specify the presence of the stated features, integers, operations, elements, and/or components, but do not preclude the presence or addition of one or more other features, integers, operations, elements, components, and/or portions thereof.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In addition, the term "optional" or "optionally" means that an event or situation as described subsequently may or may not occur. The description includes examples in which the event or situation occurs and examples in which the event or situation does not occur.

DEFINITION OF TERMS

The term "natural killer cell (NK cell)" refers to CD3-negative CD56-positive monocytes, and in particular, has cytotoxic activity against cells with low or no expression of MHC class I molecules.

The term "memory-like natural killer cell" refers to NK cells that have properties that may be reactivated upon re-stimulation thereof using cytokines or tumor antigens. Specifically, the memory-like natural killer cell refers to a cell that has characteristics similar to those of a memory cell in that the cell remains as it is, and survives for a long time, but matures functionally because it has been stimulated once, and thus the cell will have a faster response upon next stimulus thereto.

The term "cytokine induction" refers to the activation, stimulation, or re-stimulation of NK cells with cytokines while the NK cells contact the cytokines. The cytokine induction may mean, for example, the contact with the cytokines for 5, 6, 7, 8, 9, 10, 11, 12, 13, 14, 15, 16, 17, 18, 19, 20, 21, 22, 23, 24, 36, 48 hours, 3 days, 4 days, 5 days, 6 days, 10 days, 12 days, 14 days, 3 weeks or more.

The term 'stimulation' refers to addition of cytokines and the like to induce changes in the properties of NK cells. The term "re-stimulation" refers to re-inducing proliferation and characteristic change of the NK cells by adding a proper type of cytokine and the like to the medium again after a certain culture period.

In accordance with the present disclosure, increase and decrease in the expression of natural killer cell receptors are based on the results of mean intensity analysis via FACS. Specifically, the increase and decrease may be expressed in % compared to that of an untreated control. The increase and decrease may be expressed as relative increase and decrease fold compared to an expression level of conventional general natural killer cells, natural killer cells not re-stimulated using the cytokine, or conventional general natural killer cell-derived memory-like natural killer cells.

For example, the increase in expression of NKp30 may be expressed in % compared to that of the untreated control. The % change is compared with % change in conventional general natural killer cells, natural killer cells (PB(−)) not re-stimulated using the cytokine, or conventional general natural killer cell-derived memory-like natural killer cells (PB(+)). Thus, the increase or decrease may be identified based on the comparison result. Further, the increase in expression of NKp30 may be expressed in % compared to that of the untreated control. The % change is compared with % change in conventional general natural killer cells, natural killer cells (PB(−)) not re-stimulated using the cytokine, or conventional general natural killer cell-derived memory-like natural killer cells (PB(+)). Thus, the increase or decrease may be identified based on the comparison result. Further, the increase ratio in expression of NKp30 may be expressed as a fold. The fold may be determined based on a ratio of the increase % in expression of NKp30 in the cytokine-induced memory-like natural killer cells according to the present disclosure with respect to the increase % in expression of NKp30 in conventional general natural killer cells, natural killer cells (PB(−)) not re-stimulated using the cytokine, or conventional general natural killer cell-derived memory-like natural killer cells (PB(+)).

As used herein, the term "conventional general natural killer cell" means an NK cell that is separated from the human body and maintains its characteristics as it is separated from the human body without any additional stimulation process thereto. Specifically, the conventional general natural killer cell refers to a natural killer cell that may be obtained via a method of separating cells having CD3-negative and/or CD56-positive characteristics from monocytes and the like as a commonly known NK cell separation method.

As used herein, the term "natural killer cells not re-stimulated using cytokines, etc." refer to natural killer cells which are subject to a usual known first stimulation process (e.g., cytokine treatment, stimulation using tumor antigens), and then are not subject to a subsequent re-stimulation procedure. Although some of the characteristics of the natural killer cells may be modified via the first stimulation process, the natural killer cells may not exhibit as the characteristics of the memory-like natural killer cell because the natural killer cells are not subject to the re-stimulation process. For example, the first stimulation process may include stimulation via treatment of the NK cells with a mixture of IL-15 and IL-21 immediately after obtaining the NK cells. Further, the first stimulation process may be any one time stimulus using a combination of IL-12, IL-15, IL-18 and the like in a certain time after the NK cell acquisition. Further, optionally, the term "natural killer cells not re-stimulated using cytokines, etc." may further include cells such as NK cells (memory (no)) prior to a stage in which the cells are induced to the memory-like cells.

As used herein, the term "conventional general natural killer cell-derived memory-like natural killer cell" refers to an NK cell that may have characteristics of a memory-like natural killer cell via two or more stimulation processes with a combination of any cytokines or tumor antigens. Without limitations, for example, the conventional general natural killer cell-derived memory-like natural killer cell may mean a memory-like natural killer cell produced via two or more stimuli using a combination of IL-12, IL-15 and/or IL-18. Alternatively, the conventional general natural killer cell-derived memory-like natural killer cell may refer to a memory-like natural killer cell produced via a first stimulation with a viral antigen (e.g., m157 antigen) and then re-stimulation with the same antigen.

Present Disclosure

The present disclosure may provide in vivo, ex vivo, or in vitro stimulation, proliferation and production of memory-like natural killer (NK) cells capable of attacking and killing cancer cells, virus-infected cells, and certain immune cells. Further, the present disclosure may provide specific memory-like natural killer cells produced via the in vivo, ex vivo, or in vitro stimulation, proliferation and production of memory-like natural killer (NK) cells, a pharmaceutical composition including the same, and a method for treating cancer using the same.

The present disclosure provides cytokine-induced memory-like NK cells derived using at least one cytokine selected from a group consisting of IL-12, IL-15, and IL-18, and having one or more features selected from a group consisting of:

a) increase in expression of NKp30 and/or CD25 greater than increase in expression thereof in a natural killer cell isolated from peripheral blood or a known conventional memory-like natural killer cell;

b) decrease in expression of NKp44 and/or KIR2DL2/3 greater than decrease in expression thereof in a natural killer cell isolated from peripheral blood or a known conventional memory-like natural killer cell; and c) increase in secretion of IFN-γ greater than increase in secretion thereof in a natural killer cell isolated from peripheral blood or a known conventional memory-like natural killer cell.

The memory-like natural killer cells according to the present disclosure have excellent NK cell activation receptor expression ability, excellent killing ability against cancer cells, virus-infected cells and certain immune cells, and high interferon-γ expression ability compared to those of the conventional general natural killer cell-derived memory-like natural killer cells (e.g., memory-like natural killer cells as isolated from peripheral blood and then derived via conventionally known cytokine induction methods). Thus, the memory-like natural killer cells according to the present disclosure may act as a functionally excellent memory-like natural killer cell and thus be usefully used for the prevention or treatment of cancer.

In accordance with the present disclosure, the natural killer cell to be induced before inducing a memory-like natural killer cell using at least one cytokine selected from a group consisting of the IL-12, IL-15 and IL-18 refers to an NK cell obtained by treating a natural killer cell having CD3-negative characteristics with IL-15 and IL-21.

The NK cells are a subset of peripheral blood lymphocytes defined by the expression of CD56 or CD16 and the absence of a T cell receptor (CD3). NK cells detect and kill target cells lacking a major histocompatibility complex (MHC)-class I molecule.

Memory-like NK cells according to the present disclosure refer to cytokine-induced memory-like natural killer cells induced using one or more cytokine selected from a group consisting of IL-12, IL-15 and IL-18. The memory-like NK cells according to the present disclosure have increase in expression of NKp30 as a natural cytotoxic receptor and increase in expression of CD25 among NK cell activating receptors, compared to increase in expression thereof in the conventional general natural killer cell-derived memory-like natural killer cells.

Specifically, the increase in the expression of NKp30 in the memory-like NK cells according to the present disclosure may be greater by at least 5%, 10%, 15%, 20%, 30% or more than the increase in the expression of NKp30 in conventional general natural killer cells, natural killer cells (PB(−)) not re-stimulated using the cytokine, or conventional general natural killer cell-derived memory-like natural killer cells (PB(+)) (e.g., memory-like natural killer cells isolated from peripheral blood and induced using cytokine). Specifically, the increase in the expression of NKp30 in the memory-like NK cells according to the present disclosure may be compared to the increase in the expression of NKp30 in the natural killer cells isolated from peripheral blood; or known conventional memory-like natural killer cells induced via at least two stimulation times with at least one cytokine selected from a group consisting of IL-12, IL-15 and IL-18 or with viral antigens (e.g., m157 antigens).

Further, the increase in the expression of NKp30 in the memory-like NK cells according to the present disclosure may be greater 1.1 times, 1.2 times, 1.3 times, 1.4 times, 1.5 times, 1.6 times or greater than the increase in the expression of NKp30 in conventional general natural killer cells, natural killer cells (PB(−)) not re-stimulated using the cytokine, or conventional general natural killer cell-derived memory-like natural killer cells (PB(+)) (e.g., memory-like natural killer cells isolated from peripheral blood and induced using cytokine).

NKp30 is a receptor that increases the killing ability of NK cell. Therefore, the increased expression thereof has the advantage of enhancing the killing ability.

Specifically, the increase in the expression of CD25 in the memory-like NK cells according to the present disclosure may be greater by at least 5%, 10%, 15%, 20%, 30%, 40%, 50%, 60% or more than the increase in the expression of CD25 in conventional general natural killer cells, natural killer cells (PB(−)) not re-stimulated using the cytokine, or conventional general natural killer cell-derived memory-like natural killer cells (PB(+)) (e.g., memory-like natural killer cells isolated from peripheral blood and induced using cytokine). Specifically, the increase in the expression of CD25 in the memory-like NK cells according to the present disclosure may be compared to the increase in the expression of CD25 in the natural killer cells isolated from peripheral blood; or known conventional memory-like natural killer cells induced via at least two stimulation times with at least one cytokine selected from a group consisting of IL-12, IL-15 and IL-18 or with viral antigens (e.g., m157 antigens).

Further, the increase in the expression of CD25 in the memory-like NK cells according to the present disclosure may be greater 1.1 times, 1.2 times, 1.3 times, 1.4 times, 1.5 times, 1.6 times, 1.7 times, 2 times, 3 times, or greater than the increase in the expression of CD25 in conventional general natural killer cells, natural killer cells (PB(−)) not re-stimulated using the cytokine, or conventional general natural killer cell-derived memory-like natural killer cells (PB(+)) (e.g., memory-like natural killer cells isolated from peripheral blood and induced using cytokine).

CD25 is a receptor whose percentage increases when natural killer cell activity is high. The memory-like natural killer cells according to the present disclosure have an advantage in that they may express CD25 at a higher level than the general NK cells may express CD25, thereby to provide higher activity of NK cells.

Further, the memory-like natural killer cells according to the present disclosure exhibit decrease in expression of NKp44 and/or KIR2DL2/3 among NK cell activating receptors greater than decrease in expression thereof in the conventional general natural killer cell-derived memory-like natural killer cells.

Specifically, the decrease in the expression of NKp44 in the memory-like NK cells according to the present disclosure may be greater by at least 5%, 10%, 15%, 20%, 30% or more than the decrease in the expression of NKp44 in conventional general natural killer cells, natural killer cells (PB(−)) not re-stimulated using the cytokine, or conventional general natural killer cell-derived memory-like natural killer cells (PB(+)) (e.g., memory-like natural killer cells isolated from peripheral blood and induced using cytokine). Specifically, the decrease in the expression of NKp44 in the memory-like NK cells according to the present disclosure may be compared to the decrease in the expression of NKp44 in the natural killer cells isolated from peripheral blood; or known conventional memory-like natural killer cells induced via at least two stimulation times with at least one cytokine selected from a group consisting of IL-12, IL-15 and IL-18 or with viral antigens (e.g., m157 antigens).

Further, the decrease in the expression of NKp44 in the memory-like NK cells according to the present disclosure may be greater 1.1 times, 1.2 times, 1.3 times, 1.4 times, 1.5 times, 1.6 times, 1.7 times, 2 times, 3 times, or greater than the decrease in the expression of NKp44 in conventional general natural killer cells, natural killer cells (PB (−)) not re-stimulated using the cytokine, or conventional general natural killer cell-derived memory-like natural killer cells (PB(+)) (e.g., memory-like natural killer cells isolated from peripheral blood and induced using cytokine).

NKp44 has an activity inhibiting domain (an immunoreceptor tyrosine-based inhibitory motif) and thus has the potential to functionally inhibit NK cell activity. Accordingly, the inhibition of NKp44 may prevent in advance the activity of NK cells themselves from being reduced.

Specifically, the decrease in the expression of KIR2DL2/3 as the NK activity inhibitory receptor in the memory-like NK cells according to the present disclosure may be greater by at least 3%, 5%, 10%, 20%, 30% or more than the decrease in the expression of KIR2DL2/3 in conventional general natural killer cells, natural killer cells (PB(−)) not re-stimulated using the cytokine, or conventional general natural killer cell-derived memory-like natural killer cells (PB(+)) (e.g., memory-like natural killer cells isolated from peripheral blood and induced using cytokine). Specifically, the decrease in the expression of KIR2DL2/3 in the memory-like NK cells according to the present disclosure may be compared to the decrease in the expression of KIR2DL2/3 in the natural killer cells isolated from peripheral blood; or known conventional memory-like natural killer cells induced via at least two stimulation times with at least one cytokine selected from a group consisting of IL-12, IL-15 and IL-18 or with viral antigens (e.g., m157 antigens).

Further, the decrease in the expression of KIR2DL2/3 in the memory-like NK cells according to the present disclosure may be greater 1.1 times, 1.2 times, 1.3 times, 1.4 times, 1.5 times, 1.6 times, 1.7 times, 2 times, 3 times, or greater than the decrease in the expression of KIR2DL2/3 in conventional general natural killer cells, natural killer cells (PB(−)) not re-stimulated using the cytokine, or conventional general natural killer cell-derived memory-like natural killer cells (PB(+)) (e.g., memory-like natural killer cells isolated from peripheral blood and induced using cytokine).

KIR2DL2/3 is known as one of the NK activity inhibitory receptors. Accordingly, the decrease in the expression of KIR2DL2/3 may positively increase the activity of NK cells.

Further, the memory-like natural killer cells according to the present disclosure exhibit increase in expression/secretion of IFN-γ greater than increase in secretion thereof in conventional general natural killer cells, natural killer cells (PB(−)) not re-stimulated using the cytokine, or conventional general natural killer cell-derived memory-like natural killer cells (PB(+)) (e.g., memory-like natural killer cells isolated from peripheral blood and induced using cytokine).

Specifically, the increase in the expression/secretion of IFN-γ in the memory-like NK cells according to the present disclosure may be greater by at least 20%, 30%, 40%, 50%, 60%, 100%, 200%, 300%, 400%, 500%, 1,000%, 2,000%, 3,000% or more than the increase in the expression/secretion of IFN-γ in conventional general natural killer cells, natural killer cells (PB(−)) not re-stimulated using the cytokine, or conventional general natural killer cell-derived memory-like natural killer cells (PB(+)) (e.g., memory-like natural killer cells isolated from peripheral blood and induced using cytokine). Specifically, the increase in the expression/secretion of IFN-γ in the memory-like NK cells according to the present disclosure may be compared to the increase in the expression/secretion of IFN-γ in the natural killer cells isolated from peripheral blood; or known conventional memory-like natural killer cells induced via at least two stimulation times with at least one cytokine selected from a group consisting of IL-12, IL-15 and IL-18 or with viral antigens (e.g., m157 antigens).

Increasing secretion of IFN-γ may greatly increase the killing ability of natural killer cells, and may stimulate other immune cells in addition to NK cells to greatly enhance the anti-cancer immune function.

Further, the memory-like natural killer cells according to the present disclosure have exhibited enhanced killing ability in comparison with conventional general natural killer cells, natural killer cells (PB(−)) not re-stimulated using the cytokine, or conventional general natural killer cell-derived memory-like natural killer cells (PB(+)) (e.g., memory-like natural killer cells isolated from peripheral blood and induced using cytokine). Specifically, the ability of the memory-like natural killer cells according to the present disclosure to kill the cancer cells, virus-infected cells or both may be greater than the killing ability of the natural killer cells isolated from peripheral blood; or known conventional memory-like natural killer cells induced via at least two stimulation times with at least one cytokine selected from a group consisting of IL-12, IL-15 and IL-18 or with viral antigens (e.g., m157 antigens).

Infusion of NK cells may act as a method of treatment for cancer patients sensitive to NK cell lysis and having, for example, hematologic cancer (e.g., acute myeloid leukemia or multiple myeloma) and several solid cancers (e.g., brain tumor, Ewing sarcoma, liver cancer and rhabdomyosarcoma), and the like. As the number of functional NK cells increases, the efficacy of the therapeutic antibodies used in the treatment of several cancers including lymphomas, colorectal cancer, liver cancer, lung cancer, and breast cancer may be significantly increased. However, this type of customized treatment uses typical antibody-containing therapies that cost hundreds of thousands of dollars and thus is very expensive. In addition, the expected efficacy of the conventional methods is often not achieved due to a lack of immune cell binding in immunocompromised cancer patients.

Previous studies have shown that NK cell proliferation is limited to multiple divisions, and the cells are aged and stop proliferating simultaneously with the observation of telomere shortening. That is, the conventional method is capable of efficient in-vitro NK cell proliferation. However, it may be difficult to apply this conventional method to a clinical environment without a large GMP facility and capacity because the conventional method requires live support cells. Further, NK cells injected into patients are likely to cease division due to a lack of continuous stimulation by a feeder. In addition, there is still a lack of information on ability of in vitro cultured NK cells to function in an intended manner when re-injecting the in vitro cultured NK cells to the patient.

The memory-like NK cells according to the present disclosure provide a memory-like natural killer cell that may exhibit the above-mentioned superior characteristics to solve the above problems, thereby providing cells that may be used appropriately for clinical use. That is, the "memory-like NK cells" in accordance with the present disclosure are related to NK cells that have properties that may be reactivated upon cytokine or tumor antigen re-stimulation, and are used to directly and indirectly treat cancer.

In other words, the memory-like NK cells according to the present disclosure have an excellent advantage of long-term in vivo survival of NK cells and are very easily reactivated during re-stimulation thereto, and may be used for human body treatment and a production process. In particular, the memory-like NK cells according to the present disclosure has an excellent advantage in that the memory-like NK cells according to the present disclosure may greatly enhance the overall immune activity via the secretion of excess IFN-γ.

The memory-like NK cells exhibiting these characteristics according to the present disclosure may be obtained by:
1) removing only CD3-positive T cells from monocytes to obtain CD3-negative cells;
2) treating the CD3-negative cells of the step 1) with a mixture of IL-15 and IL-21 and culturing the treated CD3-negative cells; and
3) treating the cultured CD3-negative cells of the step 2) with at least one cytokine selected from a group consisting of IL-12, IL-15, and IL-18.

The memory-like NK cells induced by treating the cultured CD3-negative cells of the step 2) with at least one cytokine selected from a group consisting of IL-12, IL-15, and IL-18 may have following features:
a) increase in expression of NKp30 and/or CD25 greater than increase in expression thereof in a natural killer cell isolated from peripheral blood or a known conventional memory-like natural killer cell;
b) decrease in expression of NKp44 and/or KIR2DL2/3 greater than decrease in expression thereof in a natural killer cell isolated from peripheral blood or a known conventional memory-like natural killer cell; and
c) increase in secretion of IFN-γ greater than increase in secretion thereof in a natural killer cell isolated from peripheral blood or a known conventional memory-like natural killer cell.

In accordance with the present disclosure, treating the cells with one or more cytokine selected from a group consisting of IL-12, IL-15, and IL-18 includes treating the cells with IL-12 and IL-15: IL-12 and IL-18; or IL-15 and IL-18. This treatment may include treating the one or more NK cells with any combination of the cytokines for 1, 2, 3, 4, 5, 6, 7, 8, 9, 10, 11, 12, 13, 14, 15, 16, 17, 18, 19, 20, 21, 22, 23, 24, 36, or 48 hours. Preferably, this treatment may include treating the NK cells produced by the above-mentioned production process or the NK cells having the above-mentioned characteristics.

Furthermore, the present disclosure may provide a method for producing a cytokine-induced memory-like natural killer cell, the method including:
1) removing only CD3-positive T cells from monocytes to obtain CD3-negative cells;
2) treating the CD3-negative cells of the step 1) with a mixture of IL-15 and IL-21 and culturing the treated CD3-negative cells; and
3) treating the cultured CD3-negative cells of the step 2) with at least one cytokine selected from a group consisting of IL-12, IL-15, and IL-18,
in which the step 1) includes crosslinking the CD3-positive T cells with erythrocytes and then separating the CD3-negative cells using a density gradient during centrifugation,
in which other cytokines other than IL-15 and IL-21 do not include in the step 2).

In accordance with the present disclosure, the method for producing a cytokine-induced memory-like natural killer cell may include 1) removing only CD3-positive T cells from monocytes to obtain CD3-negative cells.

In this connection, the step 1) includes crosslinking the CD3-positive T cells with erythrocytes and then separating the CD3-negative cells using a density gradient during centrifugation. For example, the separation may be performed using a product called ROSETTESEP™ Human NK Cell Enrichment Cocktail as produced and sold by STEM-CELL Technologies. The product is a cocktail of tetrameric antibodies that recognize CD3, CD4, CD19, CD36, CD66b, CD123, and glycophorin A. CD3-positive cells, CD4-positive cells, CD19-positive cells, CD36-positive cells, CD66b-positive cells, and CD123-positive cells together with erythrocytes expressing glycophorin A bind to tetrameric antibodies to form the crosslink. After centrifugation, the cells form pellets due to a density gradient, and then a medium in which CD3-negative NK cells are concentrated in a top layer thereof at a high concentration may be obtained.

The production method of the cytokine-induced memory-like natural killer cells according to the present disclosure includes 2) treating the CD3-negative cells of the step 1) with a mixture of IL-15 and IL-21 and culturing the treated CD3-negative cells.

The culturing of step 2) may have a culture level that may be arbitrarily controlled by those skilled in the art, unless an abnormality in the shape and activity of the cells is not exhibited by the control. In this case, the culture may be performed using a stationary culture or suspension culture. The stationary culture means culturing the cells in the incubator without agitating or shaking the cells. The suspension culture means that the cells are cultured in a suspension state while the cells are not affixed to the lower or side part of the reactor via aeration or agitation. Further, the reactor for stationary culture and the reactor for suspension culture may be the same as or different from each other.

For example, when the reactor for stationary culture and the reactor for suspension culture are the same as each other, the stationary culture is completed in the same reactor and then, a medium containing the necessary nutrition components such as cytokine is additionally supplied thereto to incubate the cells using a suspension culture method. Alternatively, when different kinds of reactors are used, the stationary culture is completed, and then, the culture may be transferred to the reactor for suspension culture and the suspension culture may occur.

The cells cultured in the step 2) exhibit CD3-negative and CD56-positive (CD3-CD56+) characteristics. When the cytokine IL-15 and IL-21 are mixed and the cells were treated with the mixture, a novel natural killer cell exhibiting the change characteristics of NKR expression as the above-mentioned may be obtained. Such change characteristics may include changes in the expression of NKR as mentioned above with reference to NK cells.

That is, Such change characteristics may include:
a) increase in expression of NKp30 and/or CD25 greater than increase in expression thereof in a natural killer cell isolated from peripheral blood or a known conventional memory-like natural killer cell; and
b) decrease in expression of NKp44 and/or KIR2DL2/3 greater than decrease in expression thereof in a natural killer cell isolated from peripheral blood or a known conventional memory-like natural killer cell.

In this connection, the culturing may include performing the culture for an appropriate time that may result in changes in the characteristics of the cells, such as 3 days, 4 days, 5 days, 6 days, 7 days, 10 days, 14 days, 20 days, 25 days, etc. Preferably, the culturing is carried out for 5 to 20 days. The step 2) does not include treatment of any other cytokine other than IL-15 and IL-21. Treating only the above-mentioned two cytokines may allow the desired characteristics of NK cells to be expressed.

The culture medium may preferably include a medium such as a-MEM medium and Myelocult medium. Each of IL-15 and IL-21 may be added thereto at 5 ng/ml to 50 ng/ml, preferably 10 to 30 ng/ml.

The method for producing a cytokine-induced memory-like natural killer cell may include 3) treating the cultured CD3-negative cells of the step 2) with at least one cytokine selected from a group consisting of IL-12, IL-15, and IL-18.

In accordance with the present disclosure, the culturing may be to re-stimulate the NK cells as produced above. Such re-stimulation may include treating the cells with IL-12 and IL-15: IL-12 and IL-18; or IL-15 and IL-18 under the above-mentioned media condition. This treatment may be done for 1, 2, 3, 4, 5, 6, 7, 8, 9, 10, 11, 12, 13, 14, 15, 16, 17, 18, 19, 20, 21, 22, 23, 24, 36, or 48 hours. Preferably, the treatment may be carried out for 3 to 10 hours. The re-stimulation treatment as described above may allow producing the cell having the characteristics of the above-mentioned memory-like natural killer cell.

Each of the above cytokines may be added at 5 ng/ml to 50 ng/ml, preferably at 10 to 30 ng/ml.

The memory-like natural killer cells produced by the production method in accordance with the present disclosure may exhibit functionally superior characteristics compared to the conventional natural killer cell-derived memory-like natural killer cells and thus may be usefully used for anticancer directly or indirectly.

Accordingly, the present disclosure provides a memory-like natural killer cell produced by the production method of the cytokine-induced memory-like natural killer cell.

Specifically, the memory-like natural killer cell produced by the production method of the cytokine-induced memory-like natural killer cell may be obtained by:
1) removing only CD3-positive T cells from monocytes to obtain CD3-negative cells;

2) treating the CD3-negative cells of the step 1) with a mixture of IL-15 and IL-21 and culturing the treated CD3-negative cells; and 3) treating the cultured CD3-negative cells of the step 2) with at least one cytokine selected from a group consisting of IL-12, IL-15, and IL-18, in which the step 1) includes crosslinking the CD3-positive T cells with erythrocytes and then separating the CD3-negative cells using a density gradient during centrifugation, in which other cytokines other than IL-15 and IL-21 do not include in the step 2).

Further, the memory-like natural killer cell produced by the production method of the cytokine-induced memory-like natural killer cell may have one or more features selected from a group consisting of:

a) increase in expression of NKp30 and/or CD25 greater than increase in expression thereof in a natural killer cell isolated from peripheral blood or a known conventional memory-like natural killer cell;

b) decrease in expression of NKp44 and/or KIR2DL2/3 greater than decrease in expression thereof in a natural killer cell isolated from peripheral blood or a known conventional memory-like natural killer cell; and c) increase in secretion of IFN-γ greater than increase in secretion thereof in a natural killer cell isolated from peripheral blood or a known conventional memory-like natural killer cell.

Moreover, the present disclosure may provide a method of treating cancer of a subject, the method including administering the cytokine-induced memory-like natural killer cell to the subject in need thereof.

Yet another exemplary embodiment of the present disclosure provides a pharmaceutical composition for preventing or treating cancer, the composition containing the cytokine-induced memory-like natural killer cells.

Yet another exemplary embodiment of the present disclosure provides a composition for use in cancer treatment, the composition containing the cytokine-induced memory-like killer cells.

Yet another exemplary embodiment of the present disclosure provides use of the cytokine-induced memory-like killer cells in production of a drug for treatment of cancer.

In accordance with the present disclosure, the cytokine-induced memory-like natural killer cells may be used as cell therapeutics. Specifically, the cell therapeutics may be pharmaceuticals (US FDA regulations) used for the purpose of treatment, diagnosis, and prevention using cells and tissues produced via isolation from an individual, culture and special manipulation. The cell therapeutics may be a medicine used for the purpose of treatment, diagnosis and prevention as produced via a series of actions such that live autologous, allogeneic, or heterologous cells are grown and screened in vitro or the biological characteristics of the cell are changed in different ways to restore the function of the cells or tissues.

The cancer may include any one selected from a group consisting of liver cancer, lung cancer, colon cancer, breast cancer, prostate cancer, ovarian cancer, pancreatic cancer, cervical cancer, thyroid cancer, laryngeal cancer, leukemia, brain tumor, neuroblastoma, retinoblastoma, head and neck cancer, salivary gland cancer, and lymphoma. The cancer may preferably be any one selected from the group consisting of colon cancer, lung cancer, liver cancer, pancreatic cancer and leukemia.

In one embodiment of the present disclosure, the treatment may include administering the memory-like natural killer cells of at least $1\times10^5$, at least $3\times10^5$, at least $3\times10^6$, at least $1\times10^6$, at least $3\times10^6$, $6\times10^6$ or more, or $1\times10^7$ or more. In accordance with the present disclosure, the composition may be administered at intervals of 14 to 42 days, preferably 14 to 35 days, more preferably 14 to 30 days. However, the interval of administration is not limited thereto.

In one embodiment of the present disclosure, the composition may be administered once weekly for four weeks or twice weekly for two weeks.

The memory-like natural killer cell according to the present disclosure has the advantage of maintaining its therapeutic effect sufficiently after thawing the memory-like natural killer cell.

The pharmaceutical composition of the present disclosure may be prepared using a pharmaceutically suitable and physiologically acceptable adjuvant in addition to the active ingredient. The adjuvant may be one or more of an excipient, a disintegrating agent, a sweetener, a binder, a coating agent, a swelling agent, a lubricant and a flavoring agent.

For administration, the composition of the present disclosure may be formulated to comprise one or more pharmaceutically acceptable carriers in addition to the above-described active ingredient. The pharmaceutically acceptable carriers include saline, sterile water, Ringer's solution, buffered saline, dextrose solution, malto-dextrin solution, glycerol, ethanol, liposome and a mixture of one or more of these components. If necessary, the composition of the present disclosure may comprise other conventional additives, including antioxidants, buffers, and bacteriostatic agents. In addition, a diluent, a dispersing agent, a surfactant, a binder and a lubricant may further be added to the composition of the present disclosure to thereby prepare an injectable formulation such as an aqueous solution, a suspension or an emulsion, or a pill, capsule, granule or tablet formulation. Furthermore, a target organ-specific antibody or ligand bound to the carrier may be used so that the composition can act specifically in the target organ. Furthermore, the composition of the present disclosure may be preferably formulated by a suitable method known in the art or a method disclosed in Remington's Pharmaceutical Science (the latest edition, Mack Publishing Company, Easton PA) to prepare formulations suitable for each disease or component.

The pharmaceutical composition of the present disclosure may be provided as a liquid, suspension, dispersion, emulsion, gel, injectable solution or sustained-release formulation of the active ingredient. Preferably, the composition of the present disclosure may be formulated as an injectable solution.

If the pharmaceutical composition of the present disclosure is formulated as an injectable solution, it may be prepared as a physically or chemically very stable injectable solution by adjusting the pH with an aqueous acid solution or a buffer such as phosphate, which may be used for injection, in order to ensure the stability of the injectable formulation during distribution.

More specifically, the injectable formulation may be prepared by dissolving the composition in injectable water together with a stabilizer or a dissolution aid, and then sterilizing the solution by high-temperature sterilization under reduced pressure or by sterile filtration. The injectable water may be injectable distilled water or an injectable buffer, for example, phosphate buffered saline (pH 3.5 to 7.5) or sodium dihydrogen phosphate ($NaH_2PO_4$)-citrate buffer. The phosphate used may be in the form of sodium salt, potassium salt, anhydride or hydrate, and may also be in the form of citrate, anhydride or hydrate.

Furthermore, the stabilizer that is used in the present disclosure comprises sodium pyrosulfite, sodium bisulfite (NaHSO$_3$), sodium metabisulfite (Na$_2$S$_2$O$_3$) or ethylenediaminetetraacetic acid, and the dissolution aid comprises a base such as sodium hydroxide (NaOH), sodium hydrogen carbonate (NaHCO$_3$), sodium carbonate (NaCO$_3$) or potassium hydroxide (KOH), or an acid such as hydrochloric acid (HCl) or acetic acid (CH$_3$COOH).

The injectable formulation according to the present disclosure can be prepared to be bioabsorbable, biodegradable, biocompatible. "Bioabsorbable" means that the injectable formulation is capable of disappearing from its initial application site in the body, with or without degradation of the dispersed injectable formulation. "Biodegradable" means that the injectable formulation is capable of breaking down or degrading within the body, by hydrolysis or enzymatic degradation. Biocompatible means that all of the components are nontoxic in the body.

The injectable formulation according to the present disclosure may be prepared using conventional diluents including fillers, extenders, binders, wetting agents and surfactants or excipients.

The composition or active ingredient of the present disclosure may be administered using a conventional method by an intravenous, intra-arterial, intraperitoneal, intramuscular, intrasternal, transdermal, intranasal, subcutaneous, intrauterine, inhalation, topical, intrarectal, oral, intraocular or intradermal route depending on the intended use. Preferably, it may be administered intravenously. The composition or active ingredient of the present disclosure may be administered by injection or catheter.

In the composition of the present disclosure, the dose of the active ingredient may be adjusted within the range of $1\times10$ to $1\times10^{50}$ cells/kg, preferably $1\times10$ to $1\times10^{30}$ cells/kg, more preferably $1\times10^5$ to $1\times10^{20}$ cells/kg, most preferably $1\times10^7$ to $1\times10^9$ cells/kg, for an adult weighing 60 kg. However, the optimal dose can be easily determined by those skilled in the art, and may vary depending on various factors, including the kind of disease, the severity of the disease, the contents of the active ingredient and other components in the composition, the type of the formulation, and the patient's age, body weight, general health condition, sex and diet, the time of administration, the route of administration, the secretion rate of the composition, the time period of treatment, and a particular drug which is used in combination with the composition.

In the composition of the present disclosure, the active ingredient may be contained in an amount of 0.001-50 wt % based on the total weight of the composition. However, the content of the active ingredient is not limited thereto.

The composition of the present disclosure may further contain one or more anticancer agents.

In the present disclosure, the subjects in need of cancer treatment may be mammals, including humans. For examples, the subjects may be humans, dogs, cats, horses or the like.

As used herein, the term "therapeutically effective amount" refers to the amount of the active ingredient or pharmaceutical composition that evokes a biological or pharmaceutical response within an animal or human subject, and is an amount that is determined by researchers, veterinarians, doctors or other clinicians. The therapeutically effective amount includes an amount that leads to alleviation of symptoms of the disease or disorder to be treated. It is obvious to those skilled in the art that the therapeutically effective amount of the active ingredient and the number of administrations of the active ingredient according to the present disclosure can vary depending on the desired effect.

Hereinafter, the present disclosure will be described in detail with Examples and Experimental Examples.

However, the following Examples and Experimental Examples are merely illustrative of the present disclosure, and the present disclosure is not limited to the Examples.

EXAMPLES

Example 1. Production of Memory-Like NK Cells 1.1 NK Cell Production

Peripheral blood which passed the IRB examination and had a donor consent was obtained from Asan Medical Center (Seoul, Korea). The received peripheral blood was diluted in PBS solution (RosetteSep buffer) containing 2% FBS at 1:5 ratio. We measured the total number of cells in the diluted blood. An appropriate amount of cross-linkable ROSETTESEP™ to CD3-positive cells based on the total number was added thereto. The blood and the ROSETTESEP™ were mixed and reacted with each other for 20 minutes at room temperature. After completion of the reaction, the blood diluted solution was diluted 1.5 times with ROSETTESEP™ buffer, and was not mixed with the Ficoll-Paque solution such that layers do not mix with each other. Centrifugation for break off thereof was performed at 930 g for 20 to 30 minutes at room temperature. Then, after removing the supernatant, the isolated monocyte layer was collected and washed with the same amount of ROSETTESEP™ buffer to obtain a CD3-negative cell.

ROSETTESEP™ components include complexes in which mouse- and rat-derived monoclonal antibodies, glycophorin A antibodies, P9 antibodies serving as supporters, and P9 F(ab') antibodies form tetramers. The process of separating the CD3-negative cells may be executed as follows: the tetrameric complex of ROSETTESEP™ injected into the blood cross-links with CD3-positive cells in the blood to form an immunorosette. Thus, the immunorosette, which is denser than Ficoll, is located below Ficoll during the density gradient-based centrifugation using Ficoll. Further, at a top level, CD3-negative cells that do not bind to the tetramer complexes are accumulated. Accordingly, the CD3-positive cells and CD3-negative cells are separated from each other.

The separated CD3-negative cells were inoculated into a culture vessel at a concentration of $2\times10^6$ cells/ml, and were treated with IL-15 and IL-21 in a complete medium of alpha-MEM and were incubated at 37° C. and 5% CO$_2$. During the cultivation, the concentration of the cells did not exceed $4\times10^6$ cells/ml and the cells were divided into two groups, each having $2\times10^6$ cells/ml, using the medium under initial conditions, and each group was cultured for 10 to 22 days. Thus cultured cells were referred to as KRIBB-NK cells.

Comparative Example 1.1 Peripheral Blood-Derived NK Cell Production

On the other hand, general NK cells derived from peripheral blood were produced via the following production process. Peripheral blood was diluted at 2:1 using RPMI 1640. Then, the diluted blood was carefully placed in a top layer of Ficoll-Paque, and centrifuging at 2,000 rpm for 30 minutes was performed to prepare a mononuclear cell layer (MNC layer). Monocytes were obtained by removing erythrocytes from cells carefully taken from the monocyte cell layer. After labeling the obtained monocytes by adding CD56 microbeads (Miltenyi Biotech) to the obtained monocytes, CD56-negative cells were removed therefrom using a CS column and Vario MACS to obtain CD56-positive cells. Specifically, the CD56 microbeads (Miltenyi Biotech) capture the CD56-positive cells from monocytes to allow the CD56-positive cells to be magnetic. The CD56-positive cells attached to the microbeads among the monocytes passed through the MACS column reacting with a magnet. Thus, the CD56-positive cells remained in the column while the CD56-negative cells exited the column and were separated from the CD56-positive cells. This produced normal NK cells isolated from peripheral blood.

1.2 Production of Memory-Like NK Cells

Memory-like NK cells were produced using the NK cells produced in Example 1.1. The related production process is shown in FIG. 1(a).

Specifically, CD3-negative cells isolated as in the Example 1.1 process were treated with both IL-15 and IL-21 and were incubated for 10 days. Then, the NK cells were treated with 1) IL-12, IL-15, 2) IL-12, IL-18 or 3) IL-15, IL-18 for 6 hours to stimulate the cells to obtain the cytokine-stimulated memory-like NK cells. For convenience, the group of the NK cells of Example 1.1 as not treated with any cytokine is represented as 'no'. The groups of the NK cells of Example 1.1 as treated with the combinations of the cytokines are represented as follows: '12+15' group refers to those treated with 1) IL-12 and IL-15, '12+18' group refers to those treated with 2) IL-12 and IL-18, and '15+18' group refers to those treated with 3) IL-15 and IL-18.

Comparative Example 1.2 Production of Memory-Like NK Cell from Peripheral Blood-Derived NK Cells On the other hand, for use as a control, the normal peripheral blood-derived NK cells described in Comparative Example 1.1 were treated with a mixture of IL-12, IL-15 and IL-18 for 16 hours or were not treated and then were incubated. After being treated only with IL-15 for 9 days, re-stimulation thereof was performed for 6 hours using IL-12 and IL-15. Thus produced memory-like natural killer cells were named as positive control (+) cells and negative control (−) cells. The specific production process thereof is shown in FIG. 1(b).

The negative control (−) cell was produced in the same way as in the positive control (+) cell group. However, in the negative control (−) cell production, the process of treating the NK cells with IL-12, IL-15 and IL-18 for 16 hours immediately after separating the natural killer cells from peripheral blood was omitted. The PB-NK cell-derived memory-like natural killer cell production process as described above is illustrated as follows.

Example 2. Identification of Changes in Expression of Natural Killer Cell Receptor in Memory-Like NK Cells In order to determine change in the activity of the memory-like natural killer cells produced in Example 1.2, expression levels of representative natural killer cell receptors were analyzed using FACS, and the results are shown in FIGS. 2A-2K and FIG. 3.

More than half of the natural killer cell receptors have increases in expressions thereof in all of the '12+15', '12+18', and '15+18' groups, compared to the group not treated with cytokine (hereinafter, no).

Specifically, NKp30, an activating receptor has increase in expression thereof by about 6% (about 1.10-fold), about 14% (about 1.15-fold), or about 15% (about 1.2-fold), respectively, in the '12+15', '12+18', and '15+18' groups greater than increase in expression thereof the group (no) as not treated with cytokine.

Further, CD25, an activating receptor has increase in expression thereof by 7% (about 1.1-fold), 10% (about 1.13-fold), and 5% respectively, in the '12+15', '12+18', and '15+18' groups greater than increase in expression thereof the group (no) as not treated with cytokine.

In contrast, NKp44, an inhibitory receptor has decrease in expression thereof by about 5% in the '12+15', '12+18', and '15+18' groups greater than decrease in expression thereof the group (no) as not treated with cytokine.

Further, the positive control (+) of the PB-NK cell-derived memory-like natural killer cells has increases in the expression levels of almost of all of natural killer cell receptors greater than those in the negative control (−). However, the expression of NKp30, CD25 and KIR2DL1 receptors was greater by about 12% (about 1.2-fold), about 40% (about 2.0-fold), and about 6% (about 1.1-fold) in the '12+15' group, respectively, than those in PB-NK-(+) cells. The expression of NKp30, CD25 and KIR2DL1 receptors was greater by about 20% (about 1.25-fold), about 42% (about 2.0-fold), and about 10% (about 1.4-fold) in the '12+18' group, respectively, than those in PB-NK-(+) cells. The expression of NKp30, CD25 and KIR2DL1 receptors was greater by about 20% (1.3-fold), 40% (about 1.9-fold), and 10% (about 1.5-fold) in the '15+18' group, respectively, than those in PB-NK-(+) cells. In particular, the CD25 receptor has an expression by about two times in all of memory-like natural killer cells as produced according to the present disclosure greater than the expression of the CD25 in PB-NK-(+) cells.

On the other hand, the expression of NKp44 and KIR2DL2/3 was lower in all of memory-like natural killer cells as produced according to the present disclosure than the expression thereof in PB-NK-(+) cells.

Figure 3:
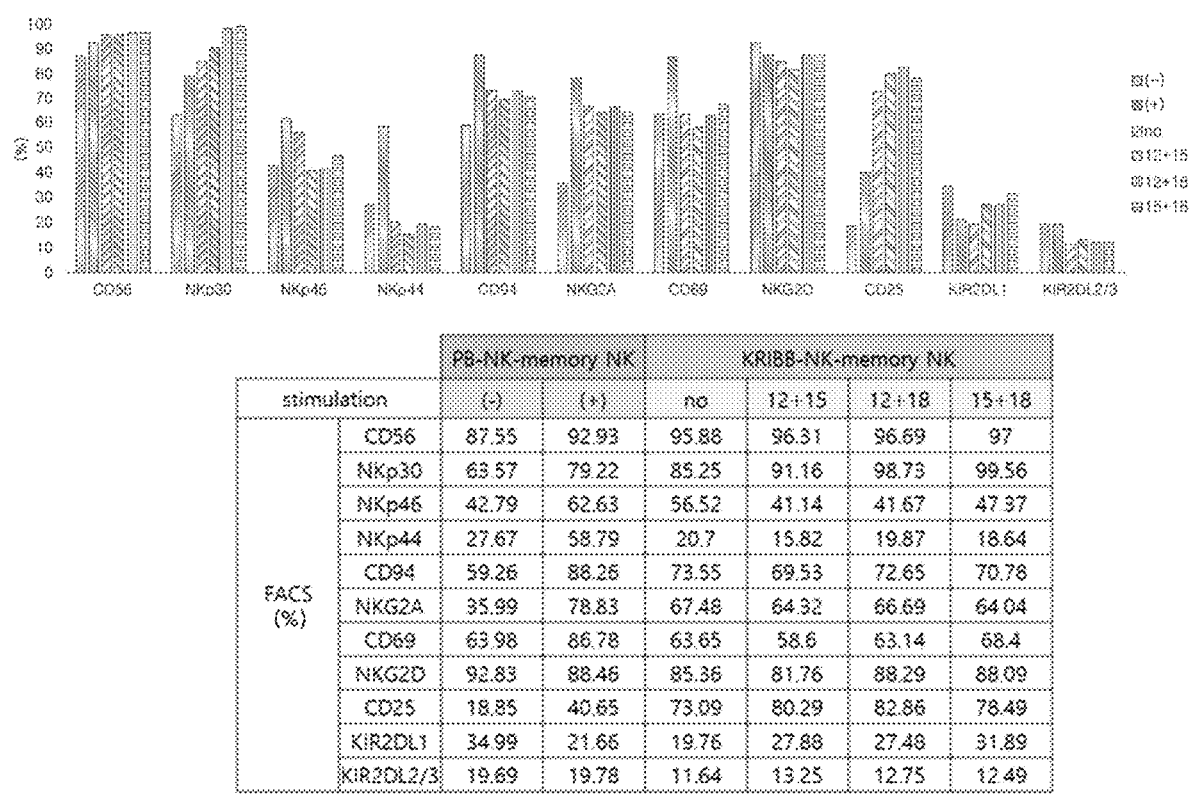
FIG. 3 shows numerical values to identify changes in natural killer cell receptor expression in cytokine-induced memory-like natural killer cells (KRIBB-NK-memory NK) according to the present disclosure and in memory-like natural killer cells (PB-NK-memory NK) produced from peripheral blood-derived natural killer cells.

Such specific numerical values are shown in FIG. 3. The specific increase or decrease percentage thereof is easily calculated based on the numerical values, and may be included in the description of the present specification.

Example 3. Identification of Changes in Killing Ability of Memory-Like NK Cells

In order to identify the killing ability of the memory-like natural killer cells produced in Example 1.2, experiments were performed.

Representative hematological cancer cell line, K562 cell line or Raji cells were stained with calcein-AM and were treated with the memory-like natural killer cells of the 12+15 and 15+18 groups as produced in Example 1.2 for four hours. Then, the direct killing ability thereof against K562 and Raji cell lines was identified. The results are shown in FIG. 4.

Figure 4:
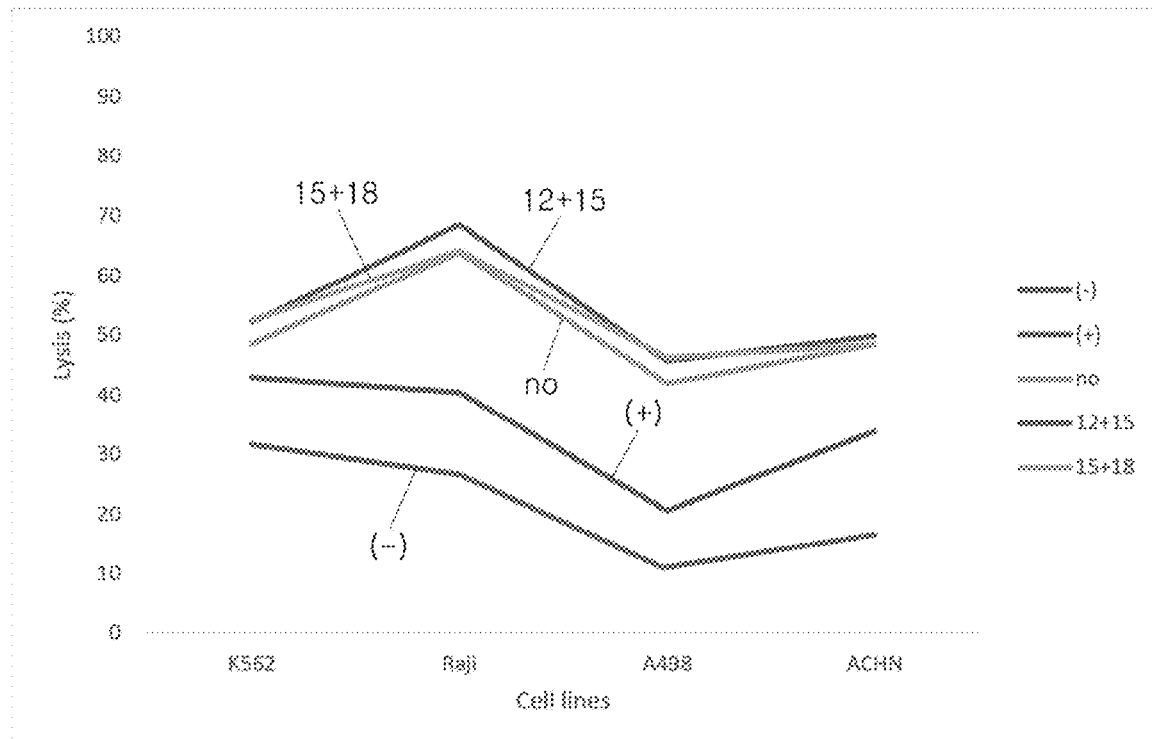
FIG. 4 shows results for identifying killing ability of K562, Raji, A498, and ACHN by cytokine-induced memory-like natural killer cells (KRIBB-NK-memory NK) according to the present disclosure and by memory-like natural killer cells (PB-NK-memory NK) produced from peripheral blood-derived natural killer cells.

As may be seen in FIG. 4, both '12+15' and '15+18' groups showed higher killing ability than unstimulated cells.

Specifically, when the content of the memory-like natural killer cells of each of the '12+15' group and the '15+18' group is 10 and the content of the target cell (K562 cell line or Raji cell) is 1, the killing ability of each group to kill the blood cancer cell lines K562 and Raji cells increased by more than 10%.

Further, the same experiments were performed on lung cancer cell lines A498 and ACHN. The killing ability of each group to kill the lung cancer cell lines increased by more than 10%.

On the other hand, the killing ability of the memory-like natural killer cells according to the present disclosure to kill all cancer cell lines was 1.2 up to 2.2 times higher than that in each of the PB-NK cell-derived memory-like NK cell (positive control (+)), and the PB-NK cell-derived memory-like NK cell (negative control (−)).

Specifically, the '12+15' group showed the highest killing ability compared to PB-NK-(+) cells. That is, the '12+15' group showed the killing ability by 1.2 times for K562, 1.7 times for Raji, and 2.2 times for A498 greater than those in the PB-NK-(+) cells. The '12+15' group showed the killing ability 1.5 times higher for ACHN than that in the PB-NK-(+) cells. The '15+18' group showed the killing ability by 1.2 times, 1.6 times, 2.2 times, and 1.4 times greater than those in the PB-NK-(+) cells. In particular, the increases of the killing abilities to kill each of all of the cancer cell lines are significantly uniform between the groups. All groups showed the greatest killing ability against A498 cells, lung cancer cell lines.

The specific numerical value thereof is shown in FIG. 4, and the specific increase or decrease percentage thereof is easily calculated based on the numerical value, and may be included in the description of the present specification.

Example 4. Identification of IFN-γ Secretion Changes in Memory-Like NK Cells

Identifying changes in the expression level of IFN-γ as a substance that a natural killer cell produces and secretes to inhibit the proliferation of cancer cells and virus-infected cells may result in identification of the characteristics of the memory-like natural killer cells produced in accordance with the present disclosure. The results are shown in FIG. 5.

As may be seen in FIG. 5, approximately 9.5-fold higher IFN-γ secretion was observed in '12+15' group cells than that in cells that were not re-stimulated with cytokine. Further, '12+18' group cells and '15+18' group cells were identified to secrete IFN-γ by 41.5 and 35.3 times more respectively than cells that were not re-stimulated with cytokine.

As may be seen above, the re-stimulation using cytokine converts the NK cells into memory cells which have the ability to secrete IFN-γ by up to 42 times more than the NK cells prior to the conversion have.

Further, from the IFN-γ detection result, it was confirmed that the amount of IFN-γ as produced and secreted by the memory-like natural killer cell according to the present disclosure was 10.2 times higher in the '12+15' group, was 44.4 times higher in the '12+18' group and was 37.7 times higher in the '15+18' group than that in the PB-NK-(+) cells.

As may be seen from the above, PB-NK-(+) cells obtained by converting precursor natural killer cells isolated from peripheral blood into memory cells have increase in expression of NK cell receptors greater that increase thereof in the PB-NK-(−) cells without the first stimulation. Thus, the former has improved ability to kill cancer cells and has IFN-γ secretion increase compared to the latter.

The cytokine-induced memory-like cells as produced according to the present disclosure have increase in expression of some NK receptors greater than increase in expression thereof in PB-NK-(+) cells obtained by converting precursor natural killer cells isolated from peripheral blood into memory cells. Thus, the former has improved ability to kill cancer cells and has IFN-γ secretion increase compared to the latter. In particular, the former has the IFN-γ production ability considerably greater than that in the latter. This suggests that the NK cells produced by the method according to the present disclosure and then stimulated with cytokine to become memory-like natural killer cells have an excellent effect and superior characteristics (e.g., cell killing ability, IFN-γ, etc.) than general NK cells or peripheral blood-derived NK cells.

In other words, the cytokine-induced memory-like natural killer cell according to the present disclosure has excellent killing ability while secreting an excessive IFN-γ, and thus may be effectively used as an anticancer agent.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A cytokine-induced memory-like NK cell obtained by:
   1) removing only CD3-positive T cells from monocytes to obtain CD3-negative cells;
   2) treating the CD3-negative cells of the step 1) with a mixture of IL-15 and IL-21 for 5 to 20 days and culturing the treated CD3-negative cells; and
   3) treating the cultured CD3-negative cells of the step 2) with (i) IL-12 and IL-15, (ii) IL-12 and IL-18, or (iii) IL-15 and IL-18 for 3 to 10 hours to yield the cytokine-induced memory-like NK cell;
   wherein the cytokine-induced memory-like NK cell without further treatment with cytokines in vitro or ex vivo subsequent to step 3) has the following features:
   a) an expression of NKp30 and/or CD25 in each case increased at least 5% compared to a natural killer cell isolated from peripheral blood or a known conventional memory-like natural killer cell;
   b) an expression of NKp44 decreased by at least 5% and/or an expression of KIR2DL2/3 decreased at least 3% in each case compared to a natural killer cell isolated from peripheral blood or a known conventional memory-like natural killer cell; and
   c) a secretion of IFN-γ increased at least 20% compared to a natural killer cell isolated from peripheral blood or a known conventional memory-like natural killer cell.

2. The cytokine-induced memory-like NK cell of claim 1, wherein the cytokine-induced memory-like NK cell exhibits a killing ability of cancer cells and/or virus-infected cells greater than a killing ability of cancer cells and/or virus-infected cells exhibited by a natural killer cell isolated from peripheral blood, or a memory-like natural killer cell induced via at least two stimulation times with at least one cytokine selected from a group consisting of IL-12, IL-15 and IL-18 or a memory-like natural killer cell induced via at least two stimulation times with viral antigen.

3. The cytokine-induced memory-like NK cell of claim 1, wherein the cytokine-induced memory-like NK cell exhibits:
   a) an expression of NKp30 increased at least 10% compared to a natural killer cell isolated from peripheral blood or a known conventional memory-like natural killer cell;

b) an expression of CD25 increased at least 50% compared to a natural killer cell isolated from peripheral blood or a known conventional memory-like natural killer cell;
c) an expression of NKp44 decreased by at least 20% compared to a natural killer cell isolated from peripheral blood or a known conventional memory-like natural killer cell;
d) an expression of KIR2DL2/3 decreased at least 20% compared to a natural killer cell isolated from peripheral blood or a known conventional memory-like natural killer cell; and
e) a secretion of IFN-γ increased at least 200% compared to a natural killer cell isolated from peripheral blood or a known conventional memory-like natural killer cell.

4. A method for producing the cytokine-induced memory-like NK cell of claim 1, said method comprising:
  1) removing only CD3-positive T cells from monocytes to obtain CD3-negative cells;
  2) treating the CD3-negative cells of the step 1) with a mixture of IL-15 and IL-21 and culturing the treated CD3-negative cells for 5 to 20 days; and
  3) treating the cultured CD3-negative cells of the step 2) with (i) IL-12 and IL-15, (ii) IL-12 and IL-18, or (iii) IL-15 and IL-18 for 3 to 10 hours to yield the cytokine-induced memory-like NK cell;
  wherein there is no treating with other cytokines in vitro or ex vivo after step 3).

5. A method of treating cancer in a subject in need thereof, the method comprising administering the cytokine-induced memory-like NK cell of claim 1 to the subject.

6. The method of claim 5, wherein the cancer is one selected from a group consisting of liver cancer, lung cancer, colon cancer, breast cancer, prostate cancer, ovarian cancer, pancreatic cancer, cervical cancer, thyroid cancer, laryngeal cancer, leukemia, brain tumor, neuroblastoma, retinoblastoma, head and neck cancer, salivary gland cancer, and lymphoma.

7. The method of claim 5, wherein the memory-like NK cell exhibits a killing ability of cancer cells and/or virus infected cells greater than a killing ability of cancer cells and/or virus-infected cells exhibited by a natural killer cell isolated from peripheral blood, or a memory-like natural killer cell induced via at least two stimulation times with at least one cytokine selected from a group consisting of IL-12, IL-15 and IL-18 or a memory-like natural killer cell induced via at least two stimulation times with viral antigen.

* * * * *